United States Patent
Ganschow et al.

(10) Patent No.: US 11,745,104 B2
(45) Date of Patent: Sep. 5, 2023

(54) METHOD AND SYSTEM FOR PROVIDING INTERACTIVE CONTENT DELIVERY AND AUDIENCE ENGAGEMENT

(71) Applicant: StreamLayer Inc., Chicago, IL (US)

(72) Inventors: Tim Ganschow, Chicago, IL (US); John Ganschow, Chicago, IL (US)

(73) Assignee: STREAMLAYER, INC., Chicago, IL (US)

( * ) Notice: Subject to any disclaimer, the term of this patent is extended or adjusted under 35 U.S.C. 154(b) by 0 days.

(21) Appl. No.: 17/073,056

(22) Filed: Oct. 16, 2020

(65) Prior Publication Data

US 2021/0031105 A1 Feb. 4, 2021

Related U.S. Application Data

(63) Continuation-in-part of application No. 16/725,095, filed on Dec. 23, 2019, and a continuation of
(Continued)

(51) Int. Cl.
*H04N 21/44* (2011.01)
*A63F 13/533* (2014.01)
(Continued)

(52) U.S. Cl.
CPC .......... *A63F 13/533* (2014.09); *A63F 13/537* (2014.09); *A63F 13/61* (2014.09);
(Continued)

(58) Field of Classification Search
None
See application file for complete search history.

(56) References Cited

U.S. PATENT DOCUMENTS 6,654,032 B1 11/2003 Zhu et al.
D611,498 S 3/2010 Alvarez
(Continued)

FOREIGN PATENT DOCUMENTS

CN 303612434 S 3/2016
CN 303906801 11/2016
(Continued)

OTHER PUBLICATIONS

U.S. Appl. No. 29/686,931, filed Apr. 9, 2019, Ganschow et al.
(Continued)

*Primary Examiner* — Jefferey F Harold
*Assistant Examiner* — Charles N Hicks
(74) *Attorney, Agent, or Firm* — Suiter Swantz pc llo

(57) ABSTRACT

A method for interactive video content is disclosed. The method may include receiving a first video program stream from a first content provider server; displaying the first video program stream received from the first content provider server; displaying an on-screen tracking overlay selector, the on-screen tracking overlay selector including one or more selectable buttons, the one or more selectable buttons including a first selectable button associated with information from one or more third-party providers; receiving a second video program stream from a second content provider server, the second video program stream including embedded overlay content associated with the first selectable button from the at least one of the one or more third-party service providers; and displaying the second video program stream including the embedded overlay content associated with first selectable button from the at least one of the one or more third-party providers.

8 Claims, 20 Drawing Sheets

Related U.S. Application Data application No. 29/709,548, filed on Oct. 15, 2019, now Pat. No. Des. 947,233.

(60) Provisional application No. 62/916,030, filed on Oct. 16, 2019, provisional application No. 62/784,261, filed on Dec. 21, 2018.

(51) Int. Cl.

| | | |
|---|---|---|
| *H04N 21/845* | (2011.01) | |
| *G06T 11/00* | (2006.01) | |
| *G06F 3/0482* | (2013.01) | |
| *G06F 3/04817* | (2022.01) | |
| *H04N 21/466* | (2011.01) | |
| *A63F 13/61* | (2014.01) | |
| *A63F 13/537* | (2014.01) | |
| *A63F 13/798* | (2014.01) | |
| *G06N 20/00* | (2019.01) | |
| *H04N 21/431* | (2011.01) | |

(52) U.S. Cl.
CPC .......... *A63F 13/798* (2014.09); *G06F 3/0482* (2013.01); *G06F 3/04817* (2013.01); *G06N 20/00* (2019.01); *G06T 11/00* (2013.01); *H04N 21/4312* (2013.01); *H04N 21/44* (2013.01); *H04N 21/4662* (2013.01); *H04N 21/845* (2013.01); *A63F 2300/303* (2013.01); *A63F 2300/308* (2013.01); *A63F 2300/5506* (2013.01); *A63F 2300/558* (2013.01)

(56) References Cited

U.S. PATENT DOCUMENTS

| | | | |
|---|---|---|---|
| D615,546 S | 5/2010 | Lundy et al. | |
| 8,301,618 B2 | 10/2012 | Allard | |
| D673,172 S | 12/2012 | Peters et al. | |
| 8,434,103 B2 | 4/2013 | Tsuchida et al. | |
| D682,304 S | 5/2013 | Mierau et al. | |
| D693,361 S | 11/2013 | Arnold et al. | |
| D701,516 S | 3/2014 | Jaini | |
| D706,806 S | 6/2014 | Nishizawa | |
| D707,250 S | 6/2014 | Fernandes | |
| 8,856,817 B2 | 10/2014 | Sinha et al. | |
| D724,616 S | 3/2015 | Jou | |
| D730,918 S | 6/2015 | Park et al. | |
| D735,221 S | 7/2015 | Mishra et al. | |
| D738,385 S | 9/2015 | Lim et al. | |
| 9,122,365 B2 | 9/2015 | Lee et al. | |
| D741,353 S | 10/2015 | Anzures et al. | |
| D749,112 S | 2/2016 | Coburn et al. | |
| D759,705 S | 6/2016 | Arroyo et al. | |
| D762,714 S | 8/2016 | Choi et al. | |
| D765,137 S | 8/2016 | Moriya | |
| 9,414,130 B2 | 8/2016 | Coan et al. | |
| D766,298 S | 9/2016 | Bae et al. | |
| 9,467,750 B2 | 10/2016 | Banica et al. | |
| D774,078 S | 12/2016 | Kisselev et al. | |
| D774,530 S | 12/2016 | Clement et al. | |
| D776,147 S | 1/2017 | Simmons et al. | |
| 9,557,878 B2 | 1/2017 | Chen et al. | |
| 9,591,372 B2 | 3/2017 | Walker et al. | |
| D788,137 S | 5/2017 | Zhu et al. | |
| D789,393 S | 6/2017 | Jaini et al. | |
| D789,976 S | 6/2017 | Gibson et al. | |
| D790,563 S | 6/2017 | Lam | |
| 9,743,153 B2 | 8/2017 | Holyoak | |
| 9,762,967 B2 | 9/2017 | Clarke et al. | |
| D804,505 S | 12/2017 | Hoffman et al. | |
| D805,101 S | 12/2017 | Zhao et al. | |
| D807,914 S | 1/2018 | Clement et al. | |
| 9,875,489 B2 | 1/2018 | Spitz et al. | |
| D814,506 S | 4/2018 | Porter | |
| D815,124 S | 4/2018 | Mariet et al. | |
| D815,128 S | 4/2018 | Phillips et al. | |
| D815,131 S | 4/2018 | Thompson et al. | |
| D816,708 S | 5/2018 | Riedel et al. | |
| D818,477 S | 5/2018 | Hoffman et al. | |
| D823,338 S | 7/2018 | Ruiz et al. | |
| 10,025,453 B2 | 7/2018 | Masuda et al. | |
| D826,961 S | 8/2018 | Lider et al. | |
| D828,375 S | 9/2018 | Mok et al. | |
| D831,059 S | 10/2018 | Bao | |
| D834,049 S | 11/2018 | Cinek et al. | |
| D842,868 S | 3/2019 | Seong et al. | |
| D847,160 S | 4/2019 | Laflamme | |
| D847,824 S | 5/2019 | Toth | |
| D849,027 S | 5/2019 | Rocha et al. | |
| D850,480 S | 6/2019 | Zhang et al. | |
| D852,214 S | 6/2019 | Westerhold et al. | |
| D852,215 S | 6/2019 | Westerhold et al. | |
| D856,347 S | 8/2019 | Cinek et al. | |
| D857,724 S | 8/2019 | Clediere et al. | |
| D857,738 S | 8/2019 | Jou | |
| D858,552 S | 9/2019 | Westerhold et al. | |
| D858,559 S | 9/2019 | Kim et al. | |
| D859,442 S | 9/2019 | Zhang et al. | |
| D859,450 S | 9/2019 | Krishna | |
| D861,025 S | 9/2019 | Stukalov et al. | |
| D870,141 S | 12/2019 | Bowden et al. | |
| D875,757 S | 2/2020 | Feng et al. | |
| D878,410 S | 3/2020 | Eu et al. | |
| D879,806 S | 3/2020 | Fatnani et al. | |
| D879,818 S | 3/2020 | Evans et al. | |
| D881,219 S | 4/2020 | Ngo et al. | |
| D881,220 S | 4/2020 | Feng et al. | |
| D885,412 S | 5/2020 | Alvarez et al. | |
| D885,421 S | 5/2020 | Lunaparra et al. | |
| D892,839 S | 8/2020 | Hansen et al. | |
| D894,951 S | 9/2020 | Krishna | |
| D896,831 S | 9/2020 | Honnette et al. | |
| D899,436 S | 10/2020 | Lider et al. | |
| D904,449 S | 12/2020 | Amini et al. | |
| D914,034 S | 3/2021 | Lee et al. | |
| D924,251 S | 7/2021 | Kim et al. | |
| 11,102,178 B2 | 8/2021 | Ding et al. | |
| D933,696 S | 10/2021 | Underwood et al. | |
| D934,285 S | 10/2021 | Underwood et al. | |
| D935,483 S | 11/2021 | Harris et al. | |
| D938,985 S | 12/2021 | Kwak | |
| D939,564 S | 12/2021 | Kwak et al. | |
| 11,209,961 B2 | 12/2021 | Pope et al. | |
| D944,282 S | 2/2022 | Underwood et al. | |
| 11,245,785 B2 | 2/2022 | Shuttleworth et al. | |
| D944,848 S | 3/2022 | Underwood et al. | |
| D947,233 S | 3/2022 | Ganschow et al. | |
| D949,909 S | 4/2022 | Paul | |
| D951,267 S | 5/2022 | Ganschow et al. | |
| D955,414 S | 6/2022 | Tompkins et al. | |
| D956,771 S | 7/2022 | Haggerty et al. | |
| D963,689 S | 9/2022 | Fang et al. | |
| D974,376 S | 1/2023 | Zhu | |
| D978,165 S | 2/2023 | Wang | |
| D978,183 S | 2/2023 | Lee | |
| 2002/0054088 A1 | 5/2002 | Tanskanen et al. | |
| 2003/0115595 A1 | 6/2003 | Stevens et al. | |
| 2003/0157976 A1 | 8/2003 | Simon et al. | |
| 2004/0229568 A1 | 11/2004 | Lowe et al. | |
| 2008/0195969 A1 | 8/2008 | Brown et al. | |
| 2009/0031431 A1 | 1/2009 | Boccon-Gibod | |
| 2009/0083668 A1 | 3/2009 | Aizawa et al. | |
| 2009/0125332 A1 | 5/2009 | Martin | |
| 2009/0217320 A1 | 8/2009 | Aldrey | |
| 2010/0319043 A1* | 12/2010 | Jain | H04N 21/4758 345/157 |
| 2011/0078023 A1 | 3/2011 | Aldrey et al. | |
| 2011/0289317 A1 | 11/2011 | Darapu et al. | |
| 2011/0289421 A1 | 11/2011 | Jordan et al. | |
| 2012/0185886 A1 | 7/2012 | Charania et al. | |

(56) References Cited

U.S. PATENT DOCUMENTS

| | | | |
|---|---|---|---|
| 2013/0007807 | A1 | 1/2013 | Grenville et al. |
| 2013/0290861 | A1 | 10/2013 | Chen et al. |
| 2013/0332850 | A1 | 12/2013 | Bovet et al. |
| 2014/0075361 | A1 | 3/2014 | Reynolds et al. |
| 2014/0229992 | A1 | 8/2014 | Ellis et al. |
| 2014/0282670 | A1* | 9/2014 | Sinha ............... H04N 21/23424 725/19 |
| 2015/0015500 | A1 | 1/2015 | Lee et al. |
| 2015/0088622 | A1 | 3/2015 | Ganschow |
| 2015/0106748 | A1 | 4/2015 | Monte et al. |
| 2015/0121278 | A1 | 4/2015 | Kim et al. |
| 2015/0248389 | A1 | 9/2015 | Kahn et al. |
| 2015/0319493 | A1 | 11/2015 | Lynch |
| 2015/0319506 | A1 | 11/2015 | Kansara et al. |
| 2016/0062639 | A1 | 3/2016 | Hwang et al. |
| 2016/0358406 | A1 | 12/2016 | Daly |
| 2016/0366464 | A1* | 12/2016 | Rouady ............... H04N 21/4312 |
| 2016/0372086 | A1 | 12/2016 | Khinchuk |
| 2017/0034237 | A1 | 2/2017 | Silver |
| 2017/0041648 | A1 | 2/2017 | Dalrymple et al. |
| 2017/0140505 | A1 | 5/2017 | Gueniot |
| 2017/0195745 | A1 | 7/2017 | Kumar Bvn et al. |
| 2017/0339462 | A1 | 11/2017 | Clarke et al. |
| 2017/0366856 | A1 | 12/2017 | Riegel et al. |
| 2018/0249206 | A1 | 8/2018 | Drori |
| 2018/0300018 | A1 | 10/2018 | Masuda et al. |
| 2018/0316948 | A1 | 11/2018 | Todd |
| 2019/0058682 | A1 | 2/2019 | MacAskill et al. |
| 2019/0076741 | A1* | 3/2019 | Thompson ....... H04N 21/21805 |
| 2019/0335209 | A1 | 10/2019 | Birrer et al. |
| 2020/0245017 | A1 | 7/2020 | Ganschow et al. |
| 2021/0031105 | A1 | 2/2021 | Ganschow et al. |
| 2021/0076099 | A1 | 3/2021 | Ganschow et al. |
| 2021/0255826 | A1 | 8/2021 | Devine et al. |

FOREIGN PATENT DOCUMENTS

| | | |
|---|---|---|
| CN | 304839205 | 10/2018 |
| EP | 3270343 A1 | 1/2018 |
| WO | 2014183034 A1 | 11/2014 |
| WO | 2017117422 A1 | 7/2017 |
| WO | 2020132682 A1 | 6/2020 |

OTHER PUBLICATIONS

U.S. Appl. No. 29/706,035, filed Sep. 17, 2019, Ganschow et al.

Stan, M. "(2013) Sidebar Animation (GIF)." Dribbble, published Sep. 11, 2013 (Retrieved from the Internet Dec. 2, 2021). Internet URL: (Year:2013).

3 Best android video player apps, https://web.archive.org/web/20170825192525/https//www.guitricks.com/2014/12/3-video-players-which-are-best-for.html (Year: 2017).

iPhone X Plus will have iPad-like landscape UI, https://www.gsmarena.com/iphone_x_plus_will_have_ipadlike_landscape_ui-news- 32551.php (Year: 2018).

Mobile vs Tablet User Interface Design—Ashwini, https://www.cognitiveclouds.com/insights/ mobile-vs-tablet-user-interface-ui-design-key-differences-explained/ (Year: 2017).

7 Best live stream apps for Android—Fedewa, https://phandroid.com/2016/12/13/best-live-stream-apps-android/ (Year:2016).

Best live streaming apps—CNET, https://www.youtube.com/watch?v=ROdbtdckb18 (Year:2016).

Zuckerberg Really Wants You to StreamLive Video on Facebook—Wired, https://www.wired.com/2016/04/facebook-really-wants-broadcast-watch-live-video/ (Year:2016).

International Search Report and Written Opinion in European Application No. 19898273.8 dated Jul. 27, 2022.

Japanese Refusal dated Jan. 13, 2023; Japanese Application No. DM/212757, p. 20.

Extended European Search Report dated Apr. 17, 2023; European Application No. 20864795.8.

"CSS: border-radius and -moz-border-radius." The Art of Web, published Feb. 7, 2010 (Retrieved from the Internet Jul. 27, 2020). Internet URL: (Year: 2010).

"React Carousel Image Gallery." React JS Example, published May 30, 2018 (Retrieved from the Internet Mar. 6, 2023). Internet URL: (Year; 2018).

Shi, Charity. "Concept: Browsing Facebook Videos on TV." Charityshi.com, published Mar. 2, 2018 (Retrieved from the Internet Mar. 6, 2023). Internet URL: (Year: 2018).

Skelton, Nick, "Share Your App content smoothly using Firebase Dynamic Links", Apr. 6, 2018, https://medium.com/a-practical-guide-to-firebase-on-android/share-your-app-content-smoothly-using-firebase-dynamic-links-82b9ec999189.

International Search Report and Written Opinion dated Apr. 1, 2020 for PCT/US2019/068369.

\* cited by examiner ent-users/audiences by delivering an engaging video viewing experience. However, internet-based video platforms fail to provide the necessary interface and back-end infrastructure permitting end-users to view video content while simul-
METHOD AND SYSTEM FOR PROVIDING INTERACTIVE CONTENT DELIVERY AND AUDIENCE ENGAGEMENT

CROSS-REFERENCE TO RELATED APPLICATIONS

The present application is a continuation-in-part application of U.S. Non-Provisional patent application Ser. No. 16/725,095 filed on Dec. 23, 2019, published on Jul. 30, 2020 as U.S. Patent Publication Number 2020/0245017, which claims the benefit of U.S. Provisional Patent Application Ser. No. 62/784,261, filed on Dec. 21, 2018; the present application also claims the benefit of U.S. Provisional Patent Application Ser. No. 62/916,030, filed on Oct. 16, 2019; the present application also is a continuation application of U.S. Design patent application Ser. No. 29/709,548, filed on Oct. 15, 2019, whereby the above-listed patent applications are incorporated herein by reference in the entirety.

TECHNICAL FIELD

The present disclosure relates to an interactive content delivery and interactive engagement platform, in particular, a software platform permitting video viewing with simultaneous real-time interaction with ancillary content within a video viewing application on any mobile computing, over-the-top (OTT) video content viewing devices, or other electronic devices capable of displaying internet-delivered video content.

BACKGROUND

Delivery of video content can be accomplished over the Internet by video streaming live and on-demand events, news, movies, and cable and traditional network television programming. Experiencing video content while simultaneously communicating and interacting with other individuals regarding the video media content often is preferable to experiencing the video media content alone. Frequently, however, an end-user is unable to be accompanied by other end-users while watching video media content and thus is relegated to watching the video programming alone.

Similarly, experiencing video content delivered over the Internet while simultaneously accessing additional information and services related to the video content such as commentary from experts or friends, sports statistics, social media feeds, betting on sports, etc.—both proprietary and from third-party sources—related to the video content often is preferable to experiencing only the video content itself. Frequently however, when an individual is watching video content via a mobile device, there is not a way to simultaneously access additional related information without exiting the video, thus disrupting the user experience. Additionally, when an individual is watching video content via an over-the-top (OTT) video content viewing device, such as a connected TV, they are forced to look at a second device for additional related information, thus missing action occurring in the primary video content.

Internet-based video platforms that deliver video content to mobile-video content providing applications and over-the-top (OTT) video content viewing devices hope to attract end-users/audiences by delivering an engaging video viewing experience. However, internet-based video platforms fail to provide the necessary interface and back-end infrastructure permitting end-users to view video content while simultaneously engaging in those activities that make video viewing more enjoyable because of the cost of designing, building and maintaining the necessary additional functionality. As a result, their viewers are not able to simultaneously view video content while engaging in activities such as communicating and interacting with friends or other end-users, accessing direct and third-party information and services related to the content, and accessing commerce related to the video content. These platforms thus not only fail to enhance the end-user experience and promote audience traffic to their platforms by providing a more immersive, engaging viewing experience, but they lose end-users/audiences over the course of the video event due to end-users exiting the video experience completely in order to open other applications in order to communicate with friends, family and other end-users, access information and services related to the video content, or engage in commerce related to the video content. This is especially true for mobile video platforms.

These internet-based video content providing applications also frequently contain disruptive advertising that delivers a negative experience to the viewer because they are forced to view the advertising instead of the video content. Or, the advertising removes the viewer from the video content providing application and places them on the advertising product's website, or encourages them to leave the application and visit the web site. This results in the loss of end-users as individuals either exit the experience because of frustration with the advertising, or because the advertising has launched a separate web browser outside the video experience that pushes the end-user from the experience, or both.

Some dedicated internet-based video content providing applications create interactive environments where end-users/audiences can communicate and interact while simultaneously viewing content. And other dedicated mobile video platforms enable end-user/audiences to access related content, specifically sports statistics, while simultaneously viewing content. These platforms, however, are purpose-built, dedicated applications and not designed to be transferable, software-as-a-service (SaaS) experiences for third parties. Additionally, none provide seamless interfaces to enable end users to easily place bets, especially fast-repeating bets, while watching video content, nor do they provide the means to easily track their active bets while watching the video content. Finally, none of these platforms provide for the ability to engage with other users in real-time active video game experiences directly tied to the live action of a real sporting event streamed and viewed in real time.

Some external third-party communications applications, such as instant messenger, Facebook Messenger, or Gmail's chat program, can be used to communicate via mobile devices. Furthermore, other external communications companies enable messaging functionality to be added to third-party mobile applications. However, none of these communication applications enable separate third-party video content providing application owners to provide the end user/audience with the ability to communicate with other individuals in the video content providing application while simultaneously watching video content. Additionally, none of these communication applications provide the end user/audience with the ability to see who among their friends is watching the same or similar content, nor do they make it easy to facilitate discussions with these friends while simultaneously watching video content. None of these communications applications enable the end-user/audience to watch video content while simultaneously accessing additional information and services related to the video content, including from third-party sources, in the video content providing application. Furthermore, none of these communication applications facilitate the sharing of this content while simultaneously watching video content.

Additionally, these third-party communications applications do not allow the owners of video content to insert advertising inventory integrated into the interface permitting end-users to view the video content while simultaneously engaging with ancillary content and services in order to maximize the value of the increased engagement from these content and services with the end-user/audiences. These third-party communications platforms also do not provide advertising directly tied to in-game activities to create unique marketing experiences based on exciting game-related accomplishments. Finally, these third-party communications platforms do not provide detailed engagement statistics to the video content owner detailing how communications were sent or information accessed while the end-user/audiences watched the video content and engaged with other content or services.

Therefore, it would be desirable to provide a system and method which cure one or more of the shortfalls of previous approaches identified above.

BRIEF DESCRIPTION OF THE DRAWINGS

The numerous advantages of the disclosure may be better understood by those skilled in the art by reference to the accompanying figures in which.

SUMMARY

Figure 1A:
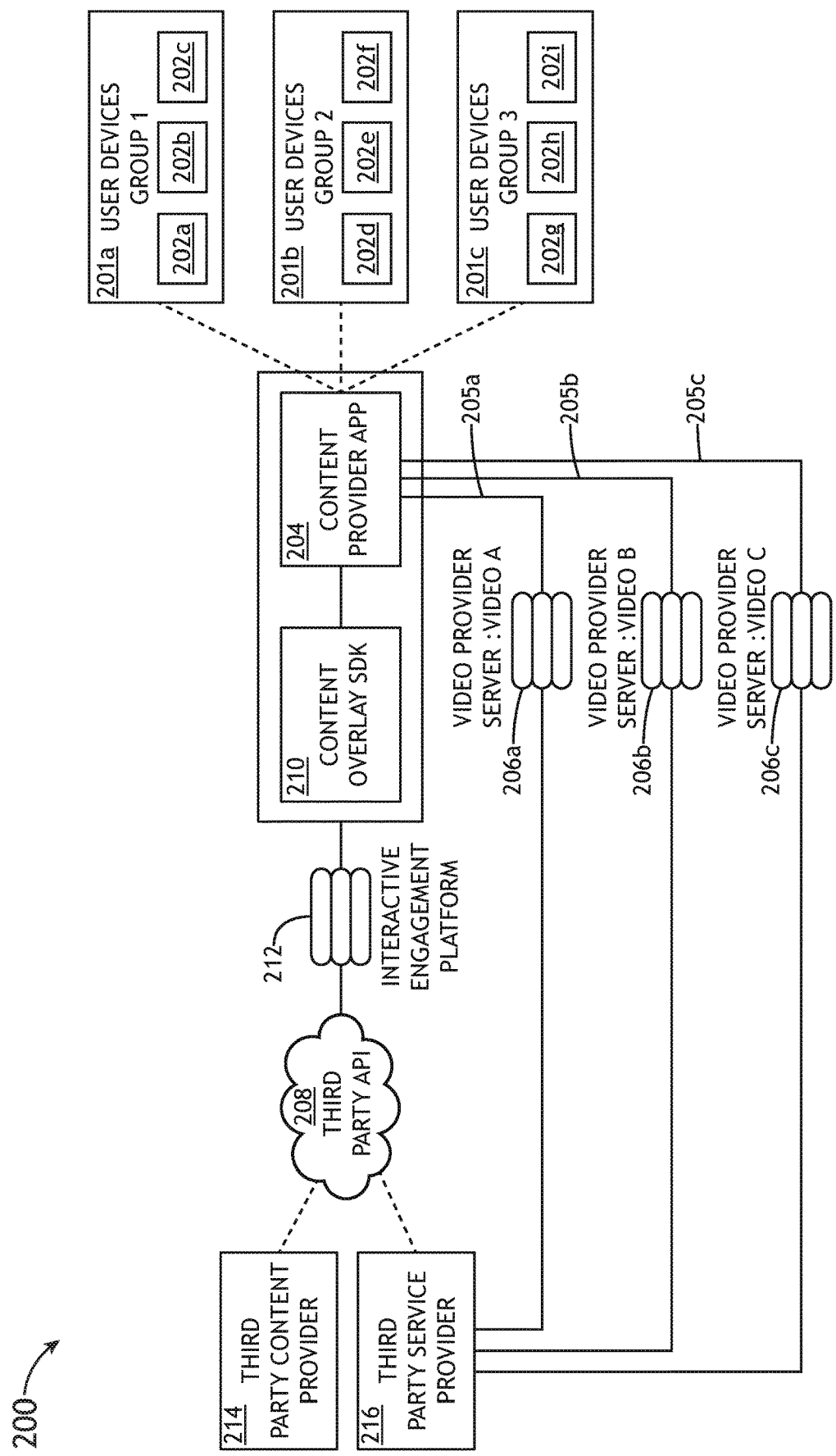
FIG. 1A illustrates a simplified block diagram of a video content system, in accordance with one or more embodiments of the present disclosure.

A system for interactive video content is disclosed, in accordance with one or more embodiments of the present disclosure. In one embodiment, the system includes a user device communicatively coupled to one or more video provider servers and at least one of one or more third-party service providers or one or more third-party content providers, the user device being configured to: receive a first video program stream from a first content provider server of the one or more content provider servers; display the first video program stream received from the first content provider server, the first video program stream including an on-screen tracking overlay; display an on-screen tracking overlay selector in response to a user selection of a portion of the on-screen tracking overlay, the on-screen tracking overlay selector including one or more selectable buttons, the one or more selectable buttons including a first selectable button associated with information from at least one of the one or more third-party service providers or the one or more third-party content providers; receive a second video program stream from a second content provider server of the one or more content provider servers in response to a user selection of the first selectable button, the second video program stream including embedded overlay content associated with the first selectable button from the at least one of the one or more third-party service providers or the one or more third-party content providers; and display the second video program stream including the embedded overlay content associated with first selectable button from the at least one of the one or more third-party service providers or the one or more third-party content providers.

A method for interactive video content is disclosed, in accordance with one or more embodiments of the present disclosure. In one embodiment, the method includes receiving a first video program stream from a first content provider server. In another embodiment, the method includes displaying the first video program stream received from the first content provider server, the video program stream including an on-screen tracking overlay. In another embodiment, the method includes displaying an on-screen tracking overlay selector in response to a user selection of a portion of the on-screen tracking overlay, the on-screen tracking overlay selector including one or more selectable buttons, the one or more selectable buttons including a first selectable button associated with information from at least one of one or more third-party service providers or one or more third-party content providers. In another embodiment, the method includes receiving a second video program stream from a second content provider server in response to a user selection of the first selectable button, the second video program stream including embedded overlay content associated with the first selectable button from the at least one of the one or more third-party service providers or the one or more third-party content providers. In another embodiment, the method includes displaying the second video program stream including the embedded overlay content associated with first selectable button from the at least one of the one or more third-party service providers or the one or more third-party content providers.

A system for interactive video content is disclosed, in accordance with one or more embodiments of the present disclosure. In one embodiment, the system includes a user device communicatively coupled to one or more content provider servers and at least one of one or more third-party service providers or one or more third-party content providers, the user device being configured to: receive a video program stream from a content provider server of the one or more content provider servers; display the video program stream received from the content provider server, the video program stream including an on-screen tracking overlay; display an on-screen tracking overlay selector in response to a user selection of a portion of the on-screen tracking overlay, the on-screen tracking overlay selector including one or more selectable buttons; extract video program data from the video program stream using a machine learning model, the one or more selectable buttons including a first selectable button associated with the extracted video program data from the video program stream; and display one or more overlays over the video program stream in response to a user selection of at least one of the one or more selectable buttons, the one or more overlays generated using the extracted video program data from the machine learning model.

A method for interactive video content is disclosed, in accordance with one or more embodiments of the present disclosure. In one embodiment, the method includes receiving a video program stream from a content provider server. In another embodiment, the method includes displaying the video program stream received from the content provider server, the video program stream including an on-screen tracking overlay. In another embodiment, the method includes displaying an on-screen tracking overlay selector in response to a user selection of a portion of the on-screen tracking overlay, the on-screen tracking overlay selector including one or more selectable buttons. In another embodiment, the method includes extracting video program data from the video program stream using a machine learning model, the one or more selectable buttons including a first selectable button associated with the extracted video program data from the video program stream. In another embodiment, the method includes displaying one or more overlays over the video program stream in response to a user selection of at least one of the one or more selectable button, the one or more overlays generated using the extracted video program data from the machine learning model.

A system for interactive video content is disclosed, in accordance with one or more embodiments of the present disclosure. In one embodiment, the system includes a user device communicatively coupled to one or more video provider servers and at least one of one or more third-party service providers or one or more third-party content providers, the user device being configured to: receive a video program stream from a content provider server of the one or more content provider servers, the video program stream including one or more time stamps; display the video program stream received from the content provider server, the video program stream including an on-screen tracking overlay; display an on-screen tracking overlay selector in response to a user selection of a portion of the on-screen tracking overlay, the on-screen tracking overlay selector including one or more selectable buttons; extract video program data using an application program interface, the video program data including one or more time stamps, the one or more selectable buttons associated with the extracted video program data from the video program data; and display one or more overlays over the video program stream in response to a user selection of at least one of the one or more selectable buttons, the one or more overlays generated using the extracted video program data from the application program interface and the one or more time stamps of the video program.

A method for interactive video content is disclosed, in accordance with one or more embodiments of the present disclosure. In one embodiment, the method includes generating a video program stream with one or more time stamps. In another embodiment, the method includes extracting real-time data from the video program stream. In another embodiment, the method includes pairing the extracted real-time data from the video program stream with one or more associated time stamps. In another embodiment, the method includes receiving the video program stream with the one or more time stamps. In another embodiment, the method includes receiving the extracted real-time data from the video program stream from a third party provider. In another embodiment, the method includes reading the one or more time stamps of the video program stream. In another embodiment, the method includes pairing the one or more time stamps of the video program stream with the extracted real-time data from the video program stream to generate extracted, time-stamped data. In another embodiment, the method includes displaying the video program stream with an on-screen tracking overlay. In another embodiment, the method includes displaying an on-screen tracking overlay selector in response to a user selection of a portion of the on-screen tracking overlay, the on-screen tracking overlay selector including one or more selectable buttons, the one or more selectable buttons associated with the extracted, time-stamped data. In another embodiment, the method includes displaying one or more overlays over the video program stream in response to a user selection of at least one of the one or more selectable buttons.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

The present disclosure relates to a social engagement software platform for internet-based video content providing applications on mobile computing user devices, (e.g., smartphones, tablets, e-book readers, laptops, and the like), over-the-top (OTT) video content systems (e.g., Apple TV, Roku, Internet-connected TVs, and the like). It is contemplated herein that the social engagement software platform may provide interactive content overlay on user devices for both live and on-demand video content. For the purposes of the present disclosure, it should be understood that video content providing applications may include native video content applications, web-based video content applications, and hybrid video content applications. Likewise, in addition to OTT systems (e.g., Apple TV, Roku, Internet-connected TVs, and the like) and mobile user devices, it should be understood that various other types of electronic devices that are capable of displaying video content (including in virtual and augmented reality formats) can be used in accordance with various embodiments discussed herein.

Embodiments of the present disclosure are directed to an interactive engagement platform of a video content system which users of video content may view the video content while simultaneously viewing, interacting, or communicating with other information and/or users in an interactive content overlay. Users may be capable of interacting with other users/audiences who are watching the same and/or different video content. The interactive content overlay of the present disclosure may be implemented in any video content providing applications capable of displaying internet-delivered video content. The interactive engagement platform also allows an end-user to watch video content while simultaneously accessing and viewing additional information related to the video content, conduct transactions related to the video content (e.g., purchasing products and services, wagering, etc.), and view advertising without leaving the video content providing application.

It is noted herein that many video content providers provide video content to users via an application-based system. For example, a user may view sports-related content provided by Entertainment and Sports Programming Network (ESPN) through the web-based ESPN application, or "app." For instance, a user may install the ESPN app on their smartphone or tablet ("user device"), and may thereby be able to view ESPN content on their user device through the ESPN app. In one embodiment, the interactive content overlay system of the present disclosure utilizes a software developer kit (SDK), which includes source code or other computing instructions, which may be implemented within the video content providing application of a user device. For example, an SDK may be implemented within the ESPN app itself. Additional embodiments of the present disclosure are directed to a set of application programming interfaces (APIs) hosted on a central interactive content overlay server. These APIs may be continually updated with proprietary features and functionality, as well as third-party content such as real-time game, league, team and player statistics. In another embodiment, a client administrator system coupled to the interactive content overlay server may schedule and pair client programming with various APIs related to supplemental content and services provided either directly from the interactive engagement platform or through independent third-party sources.

In one embodiment, the SDK implemented in the video content provider application requests and implements the APIs to create the interactive engagement platform's features and functionality within the video content providing application. End-users who are experiencing video content on the video content providing application can use a menu-launch button to access, through an interactive display layer on top of the video content, information and services related to the video, transaction opportunities (e.g., e-commerce, wagering, etc.), and also engage with other end-users using messaging, social media services and other means of communication. Additionally, advertising and various on-screen notifications may appear over the video experience. Advertisements may be triggered either directly by the client in real time, scheduled by the client ahead of time, or automatically generated by the platform based on an API trigger resulting from various in-game scenarios (e.g., two minutes left in half, goal scored, etc.), third-party service activity (change in Fantasy leaderboard position) or activity in the platform's feature set (new message from friend received) to prompt the user to take further action.

Reference will now be made in detail to the subject matter disclosed, which is illustrated in the accompanying drawings.

Referring generally to FIGS. 1A-8F, a system and method for interactive video content delivery is described, in accordance with one or more embodiments of the present disclosure.

FIG. 1A illustrates a simplified block diagram of a video content system 200, in accordance with one or more embodiments of the present disclosure. The interactive content system 200 may include, but is not limited to, one or more user devices 202, a content provider application (content provider app 204), one or more content provider servers 206, one or more third-party APIs 208, one or more third-party content providers 214, one or more third-party service providers 216, a content overlay software developer kit (content overlay SDK 210), and an interactive engagement platform 212.

In one embodiment, the one or more user devices 202 may be configured to display video content to a user. In this regard, the one or more user devices 202 may include any device capable of displaying video content including, but not limited to, smartphones, smart watches, tablets, computers, smart TVs, wearable devices, virtual/augmented reality headsets, and the like. In another embodiment, the one or more user devices 202 are configured to receive and display video content through a content provider application (content provider app 204). The content provider app 204 may be downloaded/installed on the one or more user devices 202. By way of example, the content provider app 204 may include an ESPN app, a FoxSports app, a MSNBC News app, or any other application ("app") configured to receive and display video content.

In one embodiment, the content provider app 204 is configured to receive one or more video program streams 205 from one or more content provider servers 206. The one or more content provider servers 206 may be configured to receive the video program data of the video program streams 205 from one or more third-party application program interfaces 208 (third-party APIs 208) of one or more third-party content providers 214 and/or one or more third-party service providers 216. In practice, the one or more content provider servers 206 may be configured to receive video program data from the one or more third-party content providers 214 and/or third-party service providers 216 by interfacing with the one or more third-party APIs 208. In this regard, for the sake of simplicity, data/information received from these providers may be said to be received from the one or more third-party APIs 208.

For example, as shown in FIG. 1A, the content provider app 204 may be configured to receive a first video program stream 205a from a first content provider server 206a, a second video program stream 205b from a second content provider server 206b, and a third video program stream 205c from a third content provider server 206c. For instance, in the case of a FoxSports app (e.g., FoxSports content provider app 204), the content provider app 204 may be configured to receive video program data of a first sporting event (first video program stream 205a) from a first FoxSports server (first content provider server 206a), video program data of a second sporting event (second video program stream 205b) from a second FoxSports server (second content provider server 206b), and video program data of a third sporting event (third video program stream 205c) from a third FoxSports server (third content provider server 206c). It is noted herein, however, that a single content provider server 206 may be capable of providing the content provider app 204 with multiple video program streams 205.

In one embodiment, the one or more user devices 202 may be sub-divided based on the video content being viewed. For example, as shown in FIG. 1A, a first group 201a of user devices 202a-202c may be viewing a first video program (Video Program A) via the first program stream 205a, a second group 201b of user devices 202d-202f may be viewing a second video program (Video Program B) via the second video program stream 205b, and a third group 201c of user devices 202g-202i may be viewing a third video program (Video Program C) via the third video program stream 205c. It is further noted herein that a single user device 202 may include multiple content provider apps 204. For example, a single user device 202a may include a FoxSports app (content provider app 204a), an ESPN app (content provider app 204b), and a MSNBC News app (content provider app 204c). In this regard, a single user device 202 may be configured to receive video content from a number of different content providers (e.g., content provider servers 206).

In another embodiment, interactive content overlay system 200 may include a content overlay software development kit (content overlay SDK 210) communicatively coupled to, or integrated with, the one or more content provider apps 204. For example, in the case of the FoxSports app (content provider app 204), the FoxSports app may include a content overlay SDK 210. In this regard, the one or more content overlay SDKs 210 may be installed/downloaded along with the one or more content provider apps 204 on the user devices 202 themselves.

In one embodiment, the one or more content overlay SDKs 210 are configured to receive video content data from the one or more video program streams 205. In another embodiment, an interactive engagement platform 212 may be configured to receive the video program data from the content overlay SDKs 210. For example, a content overlay SDK 210 of a FoxSports app (content provider app 204) may be configured to extract metadata from the video program streams 205a-205c and transmit the extracted metadata to the interactive engagement platform 212.

In another embodiment, the interactive engagement platform 212 may be configured to retrieve additional data/information related to the video program being displayed on a user device 202, and provide one or more supplemental data payloads to the user device 202 which are viewable to a user through an interactive content overlay produced on the user device 202. For example, extracted metadata from the video program streams 205, retrieve additional data/information related to the extracted metadata from one or more third-party content providers 214 and/or one or more third-party service providers 216, and transmit one or more control signals configured to generate an interactive content overlay on a graphical user interface of the one or more user devices 202. In this regard, the interactive engagement platform 212 may include one or more servers, one or more databases, one or more computing sub-systems, a control panel, a network interface, an API ingestion sub-system, and the like. The interactive engagement platform 212 may be further understood with reference to FIG. 1B.

Figure 1B:
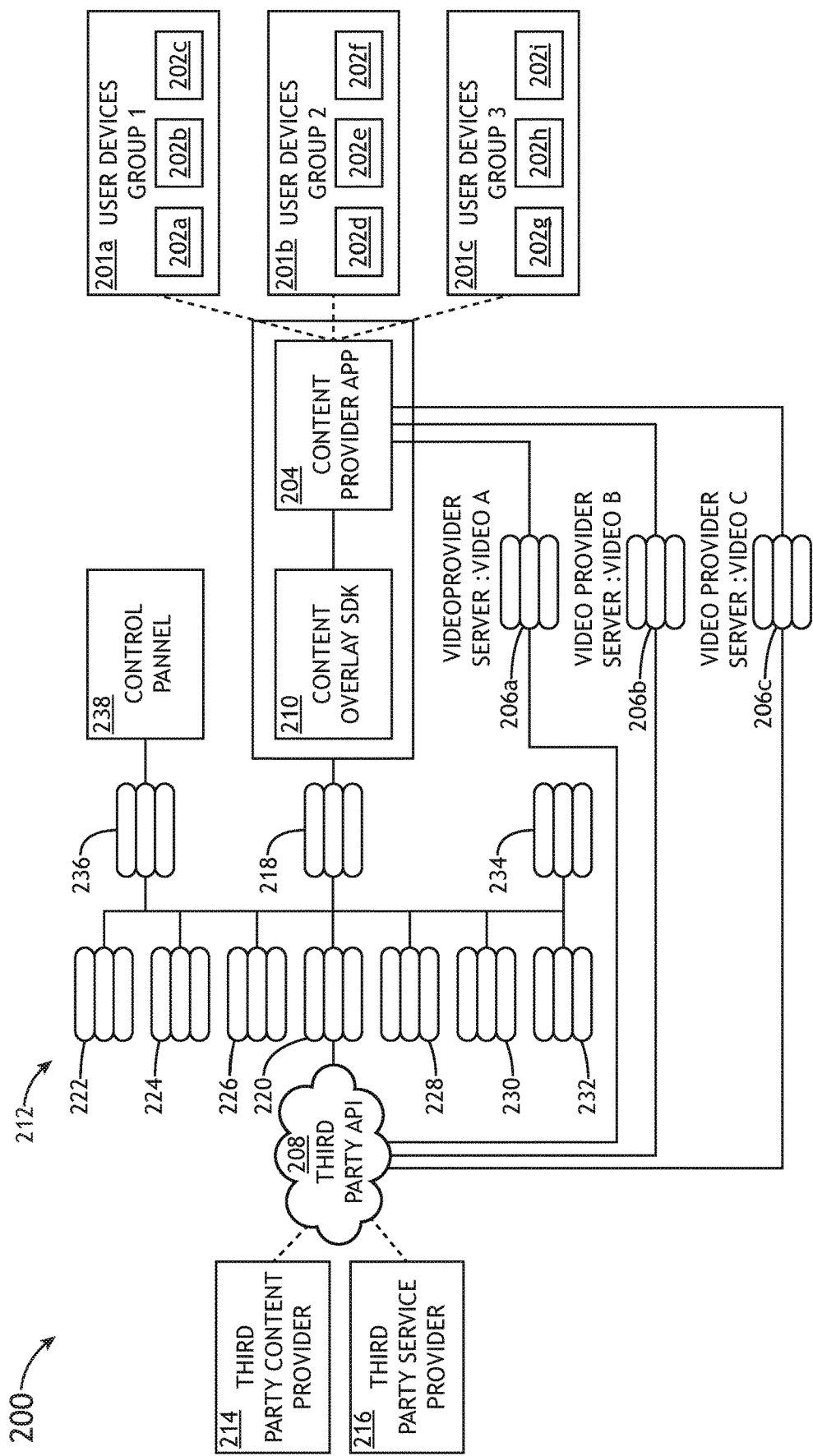
FIG. 1B illustrates a simplified block diagram of a video content system, in accordance with one or more embodiments of the present disclosure.

FIG. 1B illustrates a simplified block diagram of an interactive content overlay system 200, in accordance with one or more embodiments of the present disclosure. It is noted herein that any description associated with the interactive content overlay system 200 depicted in FIG. 1A may be regarded as applying to the interactive content overlay system 200 depicted in FIG. 1B, unless noted otherwise herein. Conversely, any description associated with the interactive content overlay system 200 depicted in FIG. 1B may be regarded as applying to the interactive content overlay system 200 depicted in FIG. 1A, unless noted otherwise herein.

The interactive engagement platform 212 may include one or more servers, systems, databases, and the like. For example, the interactive engagement platform 212 may include, but is not limited to, an SDK/API server 218, an API ingestion system 220, one or more user databases 222, an API matching system 224, an event scheduling system 226, a messaging system 228, an advertising system 230, an analytics system 232, an analysis system 234, an admin server 236, and a control panel 238. As will be described in further detail herein, it is contemplated that the various systems and servers of the interactive engagement platform 212 may take any form known in the art. For example, the various systems of the interactive engagement platform 212 may include one or more servers including one or more processors and memory. For instance, the messaging system 228 may include a dedicated server including one or more processors and memory. By way of another example, the messaging system 228 may include a messaging system communicatively coupled to the SDK/API server 218, wherein the messaging system is provided by a stand-alone messaging provider, such as Facebook Messenger, Houseparty, and the like. In this regard, it is noted herein that the interactive engagement platform 212 may include any number of servers, sub-systems, databases, and the like. In this regard, the configuration and make-up of the interactive engagement platform 212 illustrated in FIG. 1B is provided solely for illustration, and is not to be regarded as limiting, unless noted otherwise herein.

In one embodiment, the SDK/API server 218 may include data and programming instructions for carrying out various steps/features of the present disclosure. In this regard, the SDK/API server 218 may include program instructions for generating the various features and functions of an interactive content overlay on a graphical user interface of a user device 202.

An example may prove to be illustrative. In this example, a first group 201a of user devices 202a-202c may be viewing a football game (video program) through the FoxSports app (content provider app 204). The content overlay SDK 210 of the content provider app 204 may be configured to extract metadata of the video program data received through the video program stream 205a, and transmit the extracted metadata to the interactive engagement platform 212. The SDK/API server 218 of the interactive engagement platform 212 may be configured to receive the extracted metadata. The extracted metadata of a video program may include information regarding the video program including, but not limited to, the names of individuals/entities within the video program, the name of the program, the provider of the video program, and the like.

Continuing with the same example, the API ingestion server 220 may then be configured to search one or more third-party content providers 214 and/or one or more third-party service providers 216, via one or more third-party APIs 208, for additional content related to the extracted metadata. In this regard, the API ingestion server 220 may be configured to interface with the one or more third-party APIs 208 of the one or more third-party content providers 214 and/or the third-party service providers 216. For instance, if the video program was an NFL game between the Los Angeles Rams and the New England Patriots, the API ingestion system 220 may be configured to search and retrieve, from the one or more third-party content providers 214 and/or one or more third-party service providers 216, additional information/data related to the Rams, Patriots, the NFL, players/coaches on each team, and the like.

Continuing with the same example, the SDK/API server 218 of the interactive engagement platform 212 may be configured to transmit the retrieved additional information to the content overlay SDK 210 and the content provider app 204. The SDK/API server 218 may be further configured to generate one or more control signals configured to cause the one or more user devices 202 to display an interactive content menu. Furthermore, the SDK/API server 218 may be configured to generate one or more control signals configured to associate the additional content with at least one selectable button of the interactive content menu. For instance, the additional content retrieved by the one or more third-party content providers 214 and/or one or more third-party service providers 216 may include data for users to purchase Rams/Patriots/NFL merchandise, and data regarding statistics of both teams and/or particular players. In this regard, the SDK/API server 218 may be configured to associate the merchandise data with a first selectable button of the interactive content menu, and the statistics data with a second selectable button of the interactive content menu.

In another embodiment, the interactive engagement platform 212 may include one or more registration servers 222 configured to log and/or store new audience members associated with the one or more user devices 202. In this regard, the registration servers 222 may serve as a "user database" in some respects. In another embodiment, registration server 222 may include a filter server/crowd engine configured manage a global audience population and randomize or filter the global audience population based on various parameters into a limited audience population for display in the mobile content provider application 204. The interactive engagement platform 212 may further include at least one event data system 226 configured to monitor and store data related to audience-member activities while viewing video content. As it is used herein, the terms "users" or "audience members" may be regarded as referring to individuals viewing video content through the one or more user devices 202, and may be used interchangeably. In another embodiment, the interactive engagement platform 212 includes a messaging system 228 configured to receive, manage, and disseminate messages and invitations between and among audience members. As noted previously herein, the messaging system 228 may include one or more dedicated messaging servers, or may additionally/alternatively include a messaging system provided by an outside source (e.g., Facebook Messenger, Houseparty, and the like). In another embodiment, one or more media servers, including an advertising system 230, may manage receipt and dissemination of various media and data related to various video content, including advertising, which may be associated with one or more selectable buttons of the interactive overlay content generates on the user devices 202.

As noted previously herein, an API ingestion server 220 may be configured to communicatively couple, via the one or more third-party APIs 208, to one or more third-party content providers 214 and/or one or more third-party service providers 216. In this regard, the interactive engagement platform 212 may provide social engagement experiences relating to video content received from a plurality of third-party content providers 214/third-party service providers 216 across multiple mobile user devices 202. For example, the first group 201*a* of user devices 202*a*-202*c* may be viewing a first video program (Event 1), whereas the second group 201*b* and the third group 201*c* are viewing second and third video programs, respectively (Event 2 and Event 3). Events 1, 2, and 3 may each include individually distinct video content. Accordingly, the interactive content overlay system 200 including interactive engagement platform 212 may be configured to provide social engagement experiences tailored for specific audiences, specific events/programs, content providers, and the like.

Accordingly, this permits the interactive engagement platform 212 architecture to function with multiple partners producing and/or making available in their mobile video content providing application (content provider apps 204) multiple live and on-demand videos concurrently. For example, the National Football League ("NFL") and its rights holders can provide football game content having multiple, distinct implementations of the interactive content overlay produced on the graphical user interfaces of user devices 202 viewing the Chicago Bears/Green Bay Packers game. Meanwhile, individuals viewing the Dallas Cowboys/Washington Redskins game on the FoxSports mobile application would be able to simultaneously view content in the interactive content overlay pertaining to the Dallas Cowboys/Washington Redskins game.

Additionally, FoxSports could customize the interactive content overlay of generated on the graphical user interface to provide a distinct experience for different games. This may include unique content, unique functionality, or unique advertising. For example, FoxSports may sell advertising rights for the Bears/Packers game to Coca-Cola ("Coke"), and may further sell the advertising rights for the Cowboys/Redskins game to Pepsi that is occurring at the same time. In this regard, advertising provided through the interactive content overlay generated by the interactive engagement platform 212 may be particular to the video program being viewed on each particular user device 202.

It is noted herein that the one or more third-party content providers 214 and the one or more third-party service providers 216 may generally and collectively be referred to as "one or more third-party providers 214, 216."

It is further noted herein that the configuration of system 200 shown and described in FIG. 1B is not to be regarded as limiting, unless noted otherwise herein. In this regard, it is contemplated herein that various steps of functions shown and described as being carried out by one component of system 200 may additionally and/or alternatively be carried out by another component of system 200. For example, while the retrieval of supplemental content (supplemental data payloads) is shown and described as being carried out by the one or more servers of the interactive engagement platform 212 (e.g., one or more interactive engagement platform servers), this may additionally and/or alternatively be carried out by the one or more video content servers 206. For instance, the one or more video content servers 206 may be configured to extract metadata from the one or more video program streams 205, retrieve supplemental content from the one or more third-party providers 214, 216, cause the plurality of user devices 202 to display an interactive content overlay, and deliver the supplemental content to the plurality of user devices 202 such that it may be viewed/displayed within the interactive content overlay. By way of another example, the plurality of user devices 202 may themselves be communicatively coupled to the one or more third-party providers 214, 216 such that the plurality of user devices 202 are configured to extract metadata from the one or more video program streams 205, retrieve supplemental content from the one or more third-party providers 214, 216, display an interactive content overlay, and display the supplemental content within an interactive content overlay.

Figure 2A:
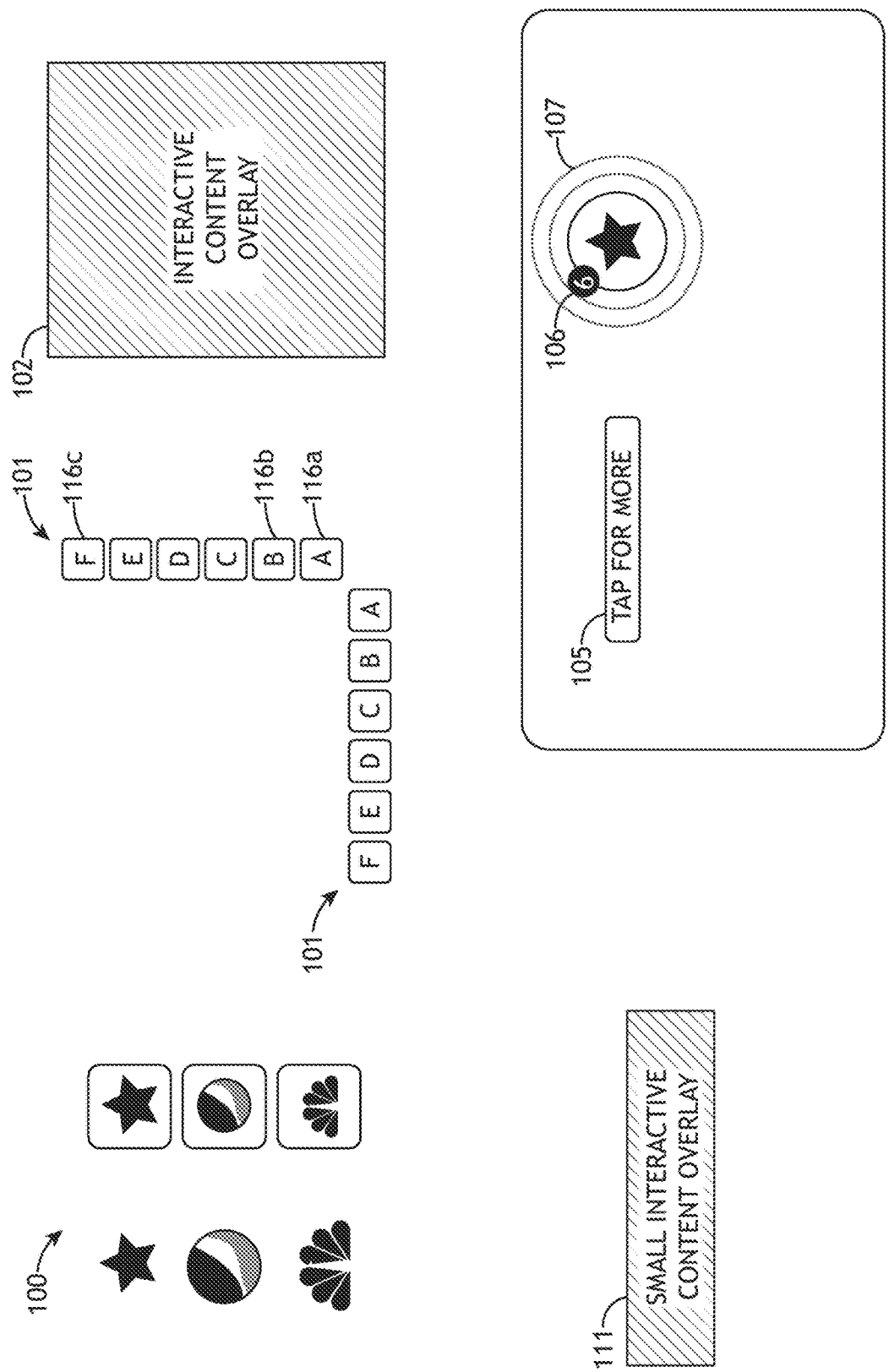
FIG. 2A illustrates various structures of an interactive content overlay for a graphical user interface, in accordance with one or more embodiments of the present disclosure.
Figure 2B:
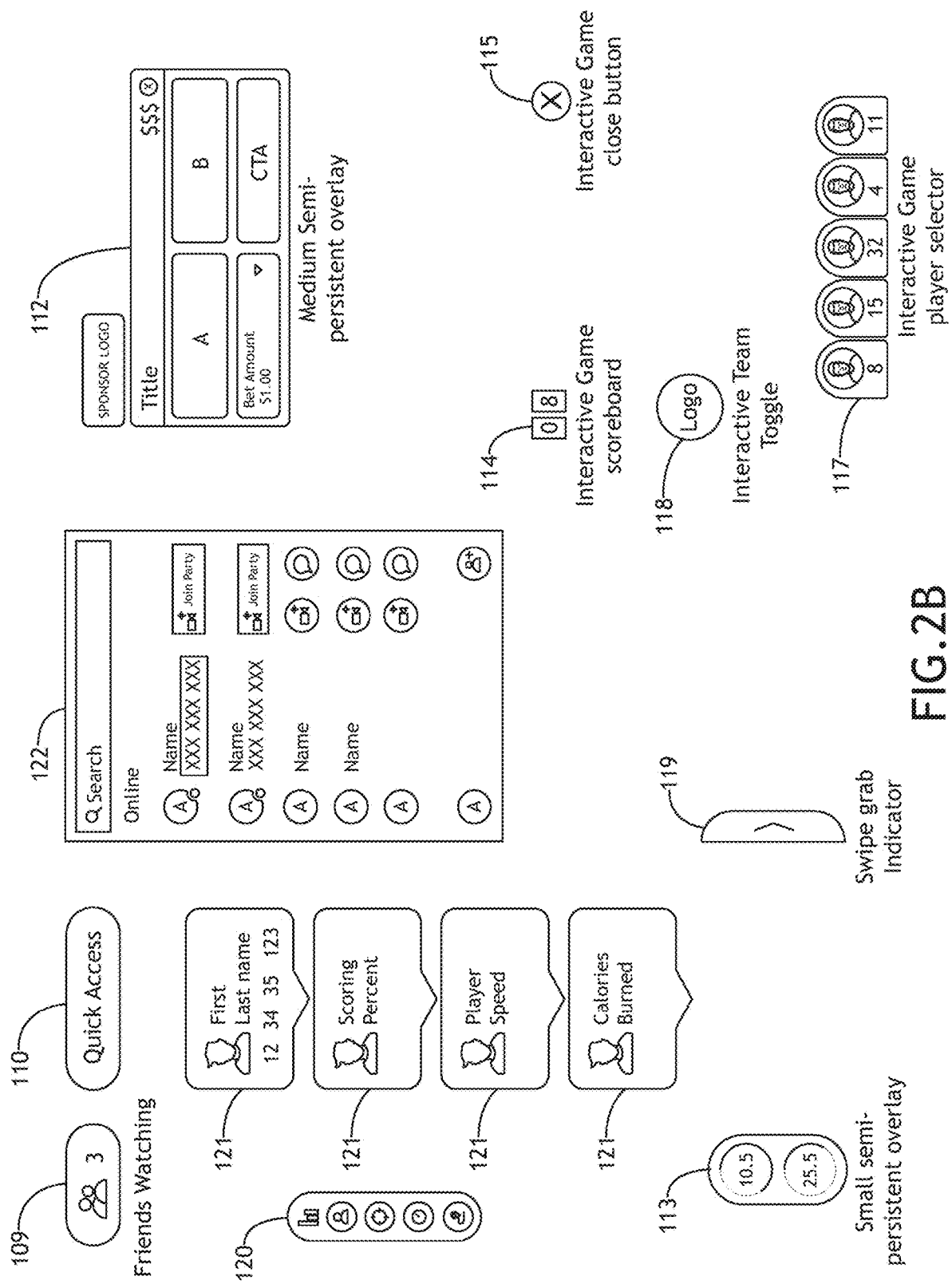
FIG. 2B illustrates various structures of an interactive content overlay for a graphical user interface, in accordance with one or more embodiments of the present disclosure.

FIGS. 2A-2B illustrate various structures of an interactive content overlay for a graphical user interface, in accordance with one or more embodiments of the present disclosure.

As noted previously herein, the interactive engagement platform 212 of the interactive content overlay system 200 may be configured to generate an interactive content overlay on the graphical user interfaces of the one or more user devices 202. As shown in FIG. 2A, an interactive content overlay may include, but is not limited to, a menu-launch button 100, a submenu button set 101 including one or more selectable buttons 116, an interactive content overlay window 102, a small interactive content overlay window 111, and tooltips 105.

Figure 3:
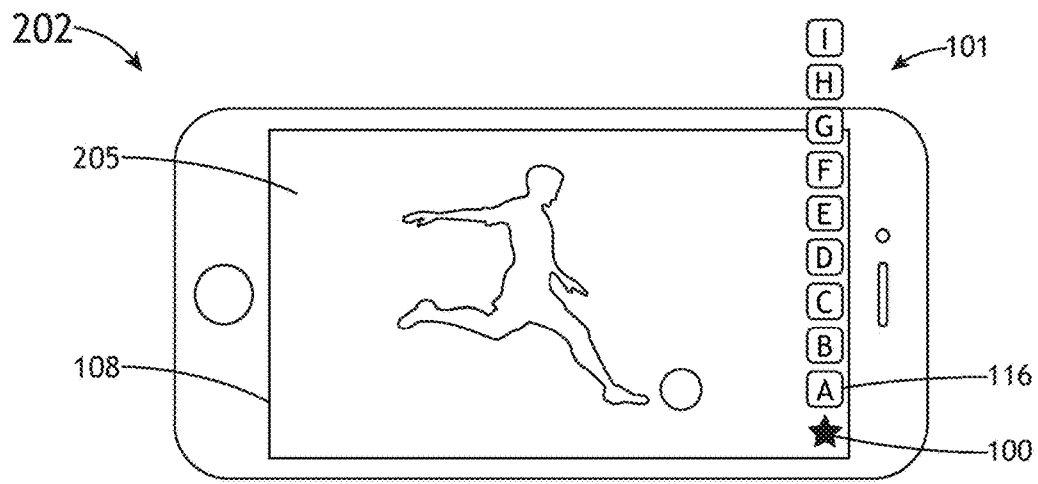
FIG. 3 illustrates an interactive content overlay on a graphical user interface of a user device a landscape orientation, in accordance with one or more embodiments of the present disclosure.
Figure 3:
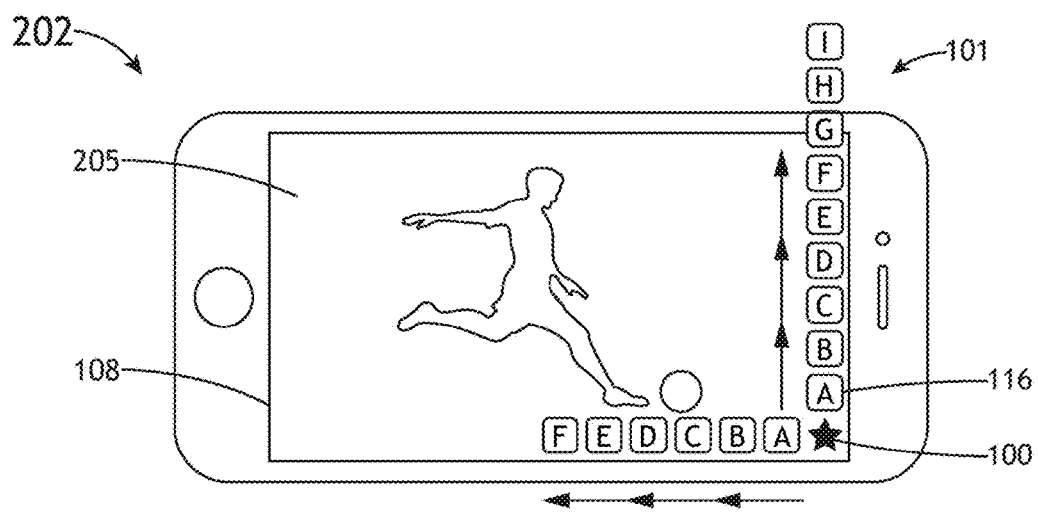
Figure 3:
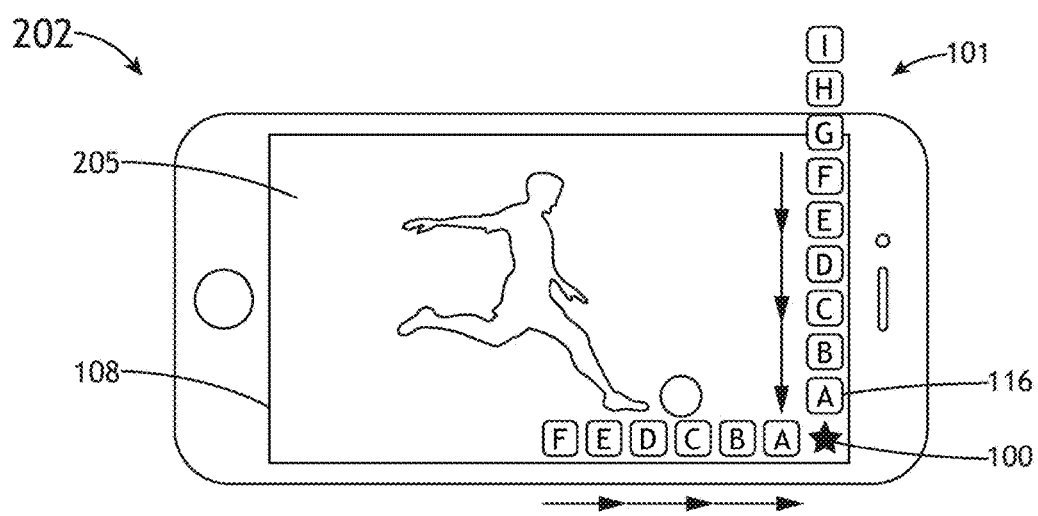

In one embodiment, a menu-launch button 100 may be customized to appear as the logo of the media partner, advertiser, team insignia, or other preferred mark. This may be similar to the watermark logos that often appear on video content, which may cause the menu-launch button 100 to appear integrated within the video program displayed on a user device 202. The submenu button set 101 including one or more selectable buttons 116 may be opened/expanded upon selection of the menu-launch button 100. As shown in FIG. 3, the submenu button set 101 may be configured in a number of configurations, including a linear-vertical configuration and a linear-horizontal configuration. Although not shown, the submenu button set 101 may be configured in a circular configuration. As noted previously herein, the interactive engagement platform 212 may be configured to associate data retrieved from third-party providers 214, 216 with the one or more selectable buttons 116 of the submenu button set 101. Additional data associated with the one or more selectable buttons may be associated with the video program being viewed, and may include, but is not limited to, messaging, third-party social media, news articles, statistics, e-commerce/transaction capabilities, merchandising, advertising, and the like.

In one embodiment, the interactive content overlay window 102 and/or the small interactive content overlay window 111 may be configured to display additional content related to the video program being viewed. In another embodiment, the interactive content overlay window 102 and/or the small interactive content overlay window 111 may be partially transparent. It is noted herein that providing for partially transparent overlay content may allow a user to view additional content/data related to the video program being viewed, while not completely obstructing the video program.

In another embodiment, a menu-launch button 100 may include tooltips 105, one or more notifications 106, and/or animations 107. The tooltips 105, notifications 106, and/or animations 107 may include attention-grabbing temporary displays configured to notify and encourage the users/audience members to interact with the menu-launch button 100. The tooltips 105, notifications 106, and/or animations 107 may be configured to make the end-user aware of new content available within the interactive content overlay provided by the interactive engagement platform 212. For example, tooltips 105, notifications 106, and/or animations 107 may inform a user of significant activity, such as the presence of a VIP in the interactive engagement platform, the availability of a new poll provided in the interactive content overlay, or new activity related to content or services provided by third-parties via APIs, such as scoring updates related to the user's daily fantasy team, a specific wager placed on a game, or a flash sale on a game jersey. The interactive content overlay on the graphical user interface may include various other controls, buttons, and functionality described herein for enabling the end-user to engage with the interactive content overlay provided by the interactive engagement platform 212.

As noted previously herein, the interactive engagement platform 212 of the interactive content overlay system 200 may be configured to generate an interactive content overlay on the graphical user interfaces of the one or more user devices 202. As shown in FIG. 2B, an interactive content overlay may include, but is not limited to, a menu-launch button 100, an interactive content overlay 102, a small interactive content overlay 104, an active contacts indicator button 109 (e.g., "who's watching indicator button 109"), a quick return selectable button 110, a contacts overlay 122, a repeatable bet overlay 112, bet tracking indicators 113, an exit button 115, in-play interactive game indicators (e.g., interactive game scoreboard 114, interactive game player selector 117, interactive game team toggle 118), a swipe grab indicator 119, an on-screen tracking overlay selector 120, and an overlay 121.

It is noted herein that other arrangements/configurations of the interactive content overlay and/or submenu button set 101 may be used without departing from the spirit and scope of the present disclosure. The interactive content overlay is further shown and described in U.S. Design patent application Ser. No. 29/686,931, filed on Apr. 9, 2019, entitled DISPLAY SCREEN OR PORTION THEREOF WITH TRANSITIONAL GRAPHICAL USER INTERFACE FOR AN INTERACTIVE CONTENT OVERLAY, and U.S. Design patent application Ser. No. 29/709,548, filed on Oct. 15, 2019, entitled DISPLAY SCREEN OR PORTION THEREOF WITH TRANSITIONAL GRAPHICAL USER INTERFACE FOR AN INTERACTIVE CONTENT OVERLAY, both of which are incorporated herein by reference in the entirety. It is noted herein the views in the incorporated design applications should be understood as providing support for the embodiments as illustrated in the incorporated design applications, for fully solid-line embodiments (e.g., the solid lines forming part of the claimed design), and/or support for embodiments with any combination of solid lines (e.g., the solid lines forming part of the claimed design) and broken lines (e.g., the broken lines representing an environment not forming part of the claimed design), for purposes of the present disclosure. In addition, it should be understood that any and/or all embodiments and/or reference numbers throughout the present disclosure are attributable to corresponding components within the views in the above design applications.

FIG. 3 illustrates a series of interactive content overlays on a graphical user interface 108 of a user device 202 a landscape orientation, in accordance with one or more embodiments of the present disclosure.

As shown in FIG. 3, when a video program stream 205 is viewed in the horizontal or landscape (full-screen) mode in a video content provider app 204 on a user device 202, the menu-launch button 100 may be located in a corner of the graphical user interface 108 over the video program stream 205. Although not shown, attention-grabbing temporary displays (e.g., tooltips 105, notifications 106, animations 107, and the like) may be added to the interactive content overlay generated on the graphical user interface 108, which may be displayed near/around the menu-launch button 100 in order to notify and encourage the end-user/audience to interact with the menu-launch button 100.

Upon selection/interaction with the menu-launch button 100, a submenu button set 101 including one or more selectable buttons 116 may appear in the same area where the menu-launch button 100 is located. It is noted herein that various types of submenu button set 101 orientations/configurations may be used without departing from the spirit and scope of the present disclosure. For example, the submenu button set 101 may be arranged in linear fashion which is displayed, in a row, horizontally along the bottom of the graphical user interface 108. By way of another example, the submenu button set 101 may be arranged in a linear fashion which is displayed, in a column, vertically along an edge of the graphical user interface 108. In one embodiment, the interactive content overlay window 102 may be generated upon selection of a selectable button 116. The interactive content overlay window 102 may be located on an opposite side of the graphical user interface 108 from where the menu-launch button 100 and submenu button set 101 is/was located. The interactive content overlay window 102 may employ a semi-transparent background/window to permit the video program stream 205 to be partially visible in the background. In another embodiment, the interactive content overlay window 102 in the horizontal, full-screen mode may be closed/collapsed when the end-user selects/ presses any part of the graphical user interface 108 which does not contain the content overlay window 102.

Figure 4:
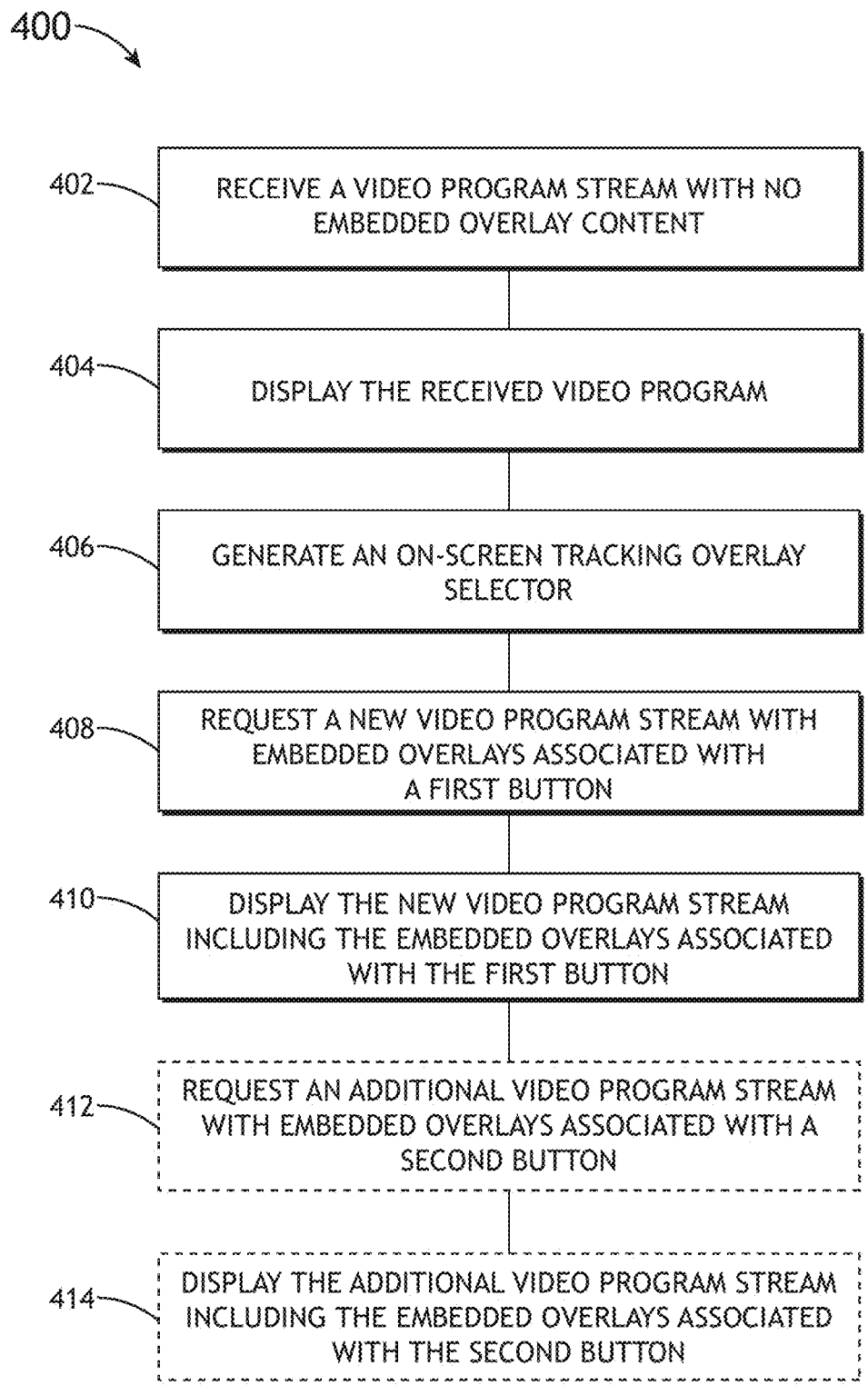
FIG. 4 illustrates a flowchart for providing interactive content overlays on a graphical user interface depicting real-time video tracking, in accordance with one or more embodiments of the present disclosure.

FIG. 4 illustrates a flowchart depicting a method 400 for providing interactive content overlays on a graphical user interface depicting real-time video tracking, in accordance with one or more embodiments of the present disclosure. It is noted herein that the steps of method 400 may be implemented all or in part by system 200. It is further recognized, however, that the method 400 is not limited to the system 200 in that additional or alternative system-level embodiments may carry out all or part of the steps of method 400.

In step 402, a content provider app 204 of a user device 202 may receive a first video program stream 205 with no embedded overlay content (e.g., a clean video program stream) from a content provider server 206. For example, the content provider app 204 may be configured to receive one or more video program streams 205 from one or more content provider servers 206. The one or more content provider servers 206 may be configured to receive the video program data of the video program streams 205 from one or more third-party application program interfaces 208 (third-party APIs 208) of one or more third-party content providers 214 and/or one or more third-party service providers 216. In practice, the one or more content provider servers 206 may be configured to receive video program data from the one or more third-party content providers 214 and/or third-party service providers 216 by interfacing with the one or more third-party APIs 208. In this regard, for the sake of simplicity, data/information received from these providers may be said to be received from the one or more third-party APIs 208.

Figure 7A:
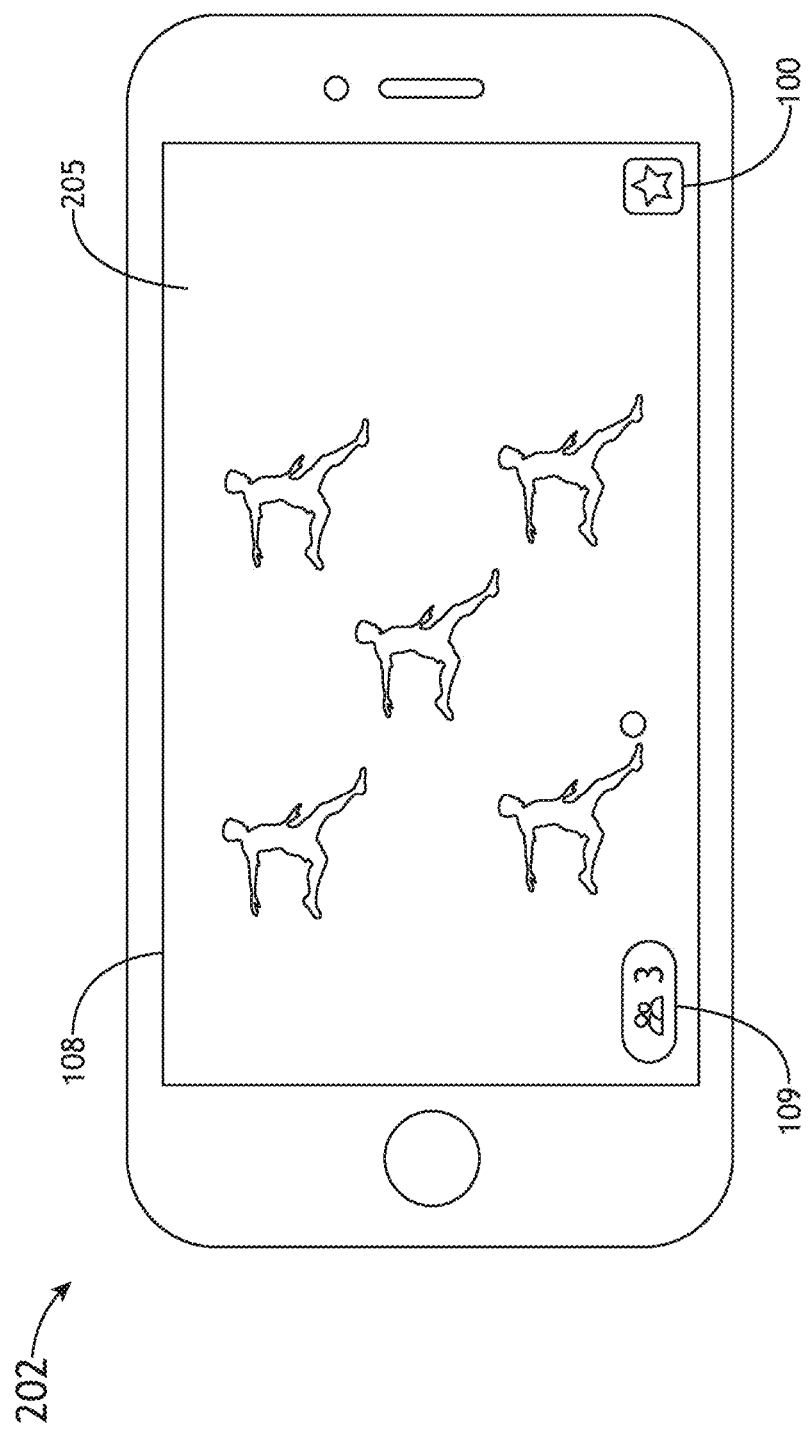
FIGS. 7A-7F illustrate a series of interactive content overlays on a graphical user interface depicting real-time video tracking, in accordance with one or more embodiments of the present disclosure.
Figure 7B:
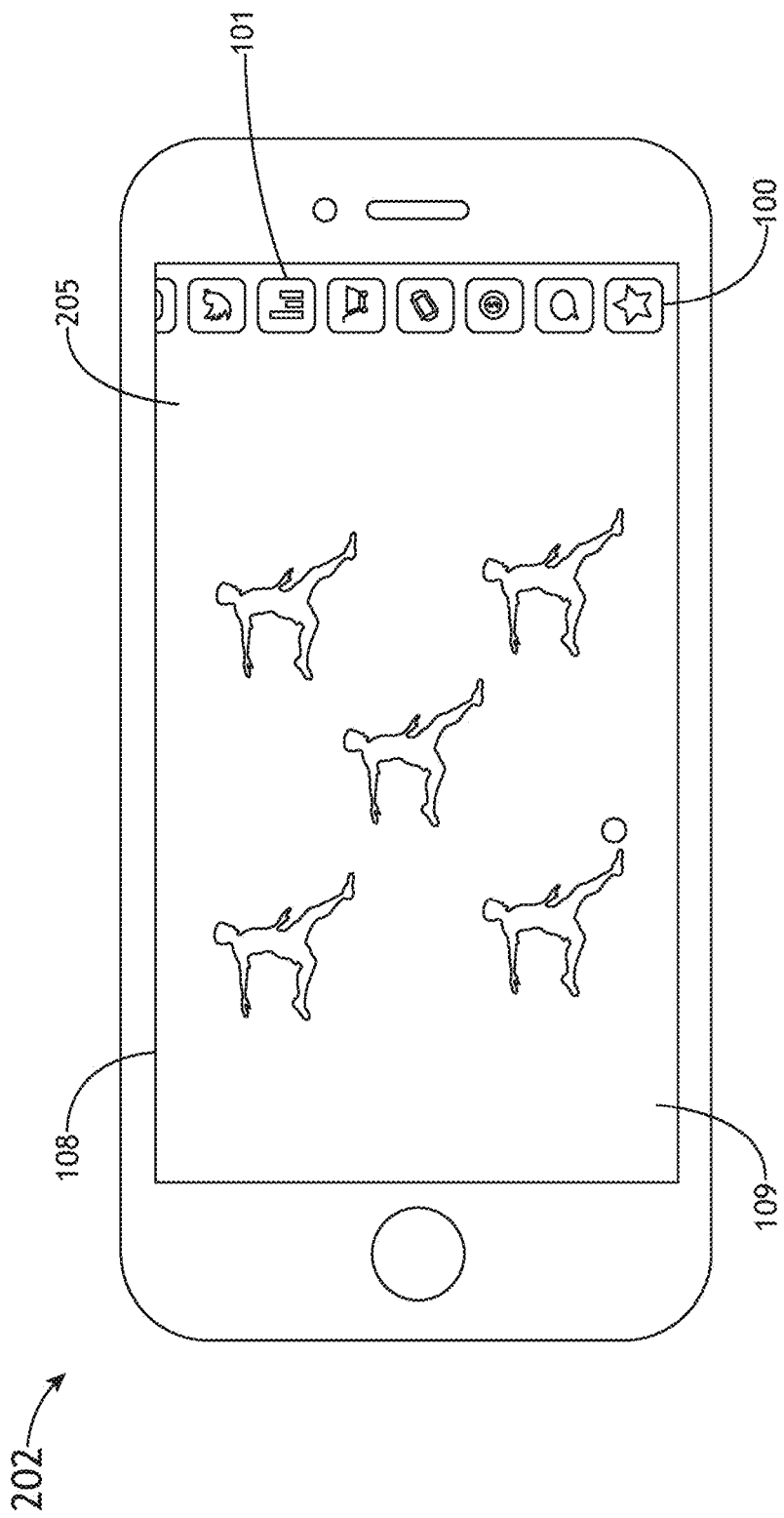
Figure 7C:
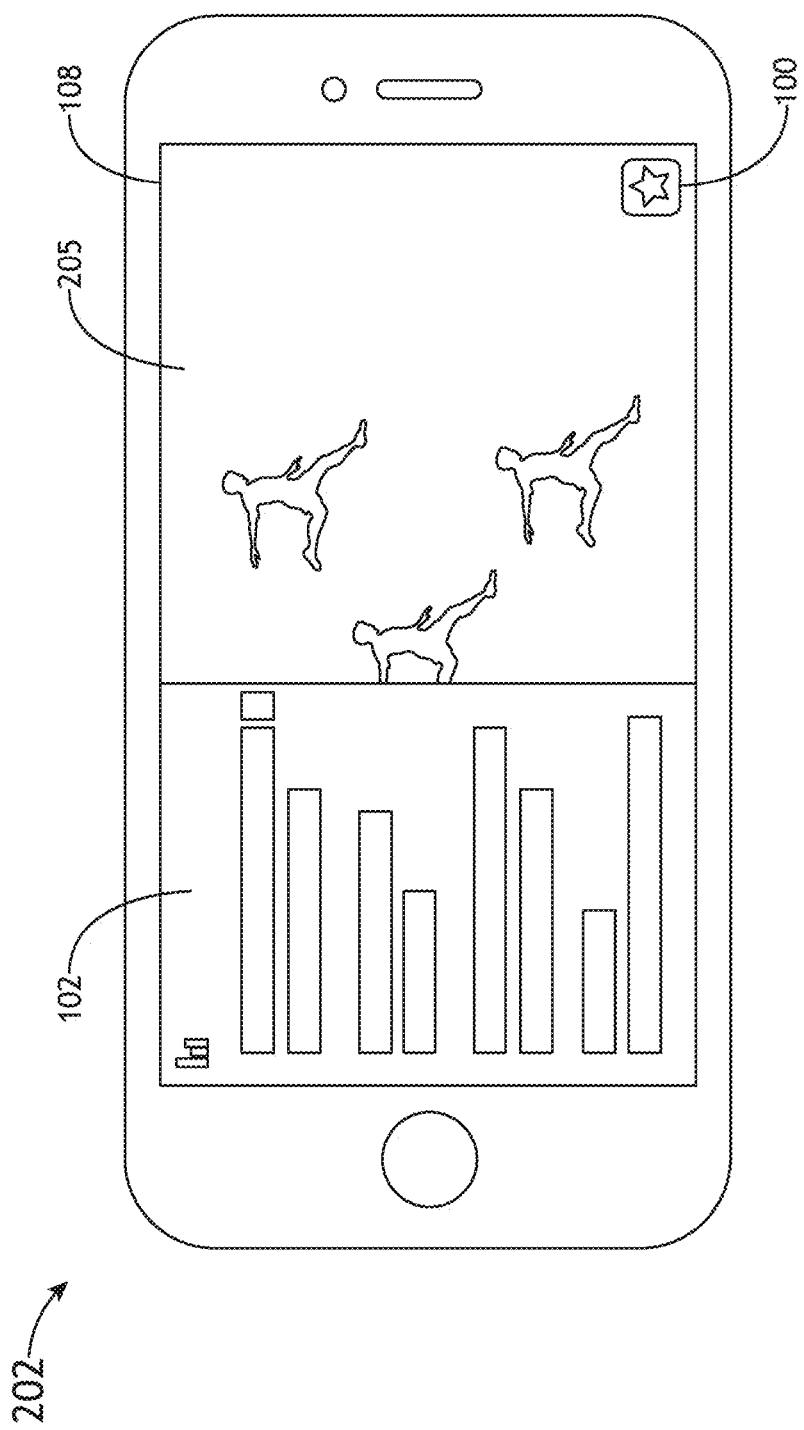
Figure 8A:
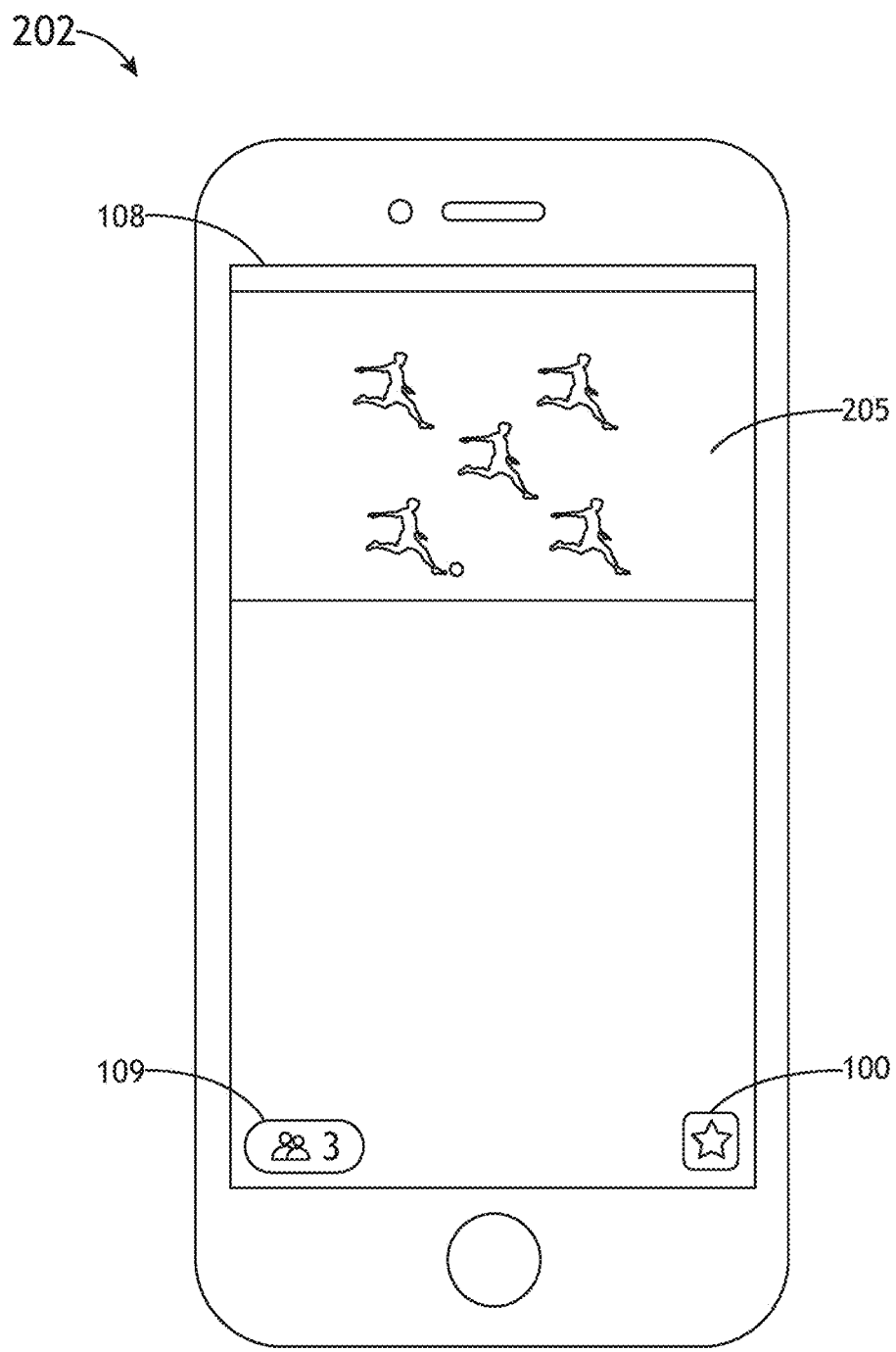
FIGS. 8A-8F illustrate a series of interactive content overlays on a graphical user interface depicting real-time video tracking, in accordance with one or more embodiments of the present disclosure.
Figure 8B:
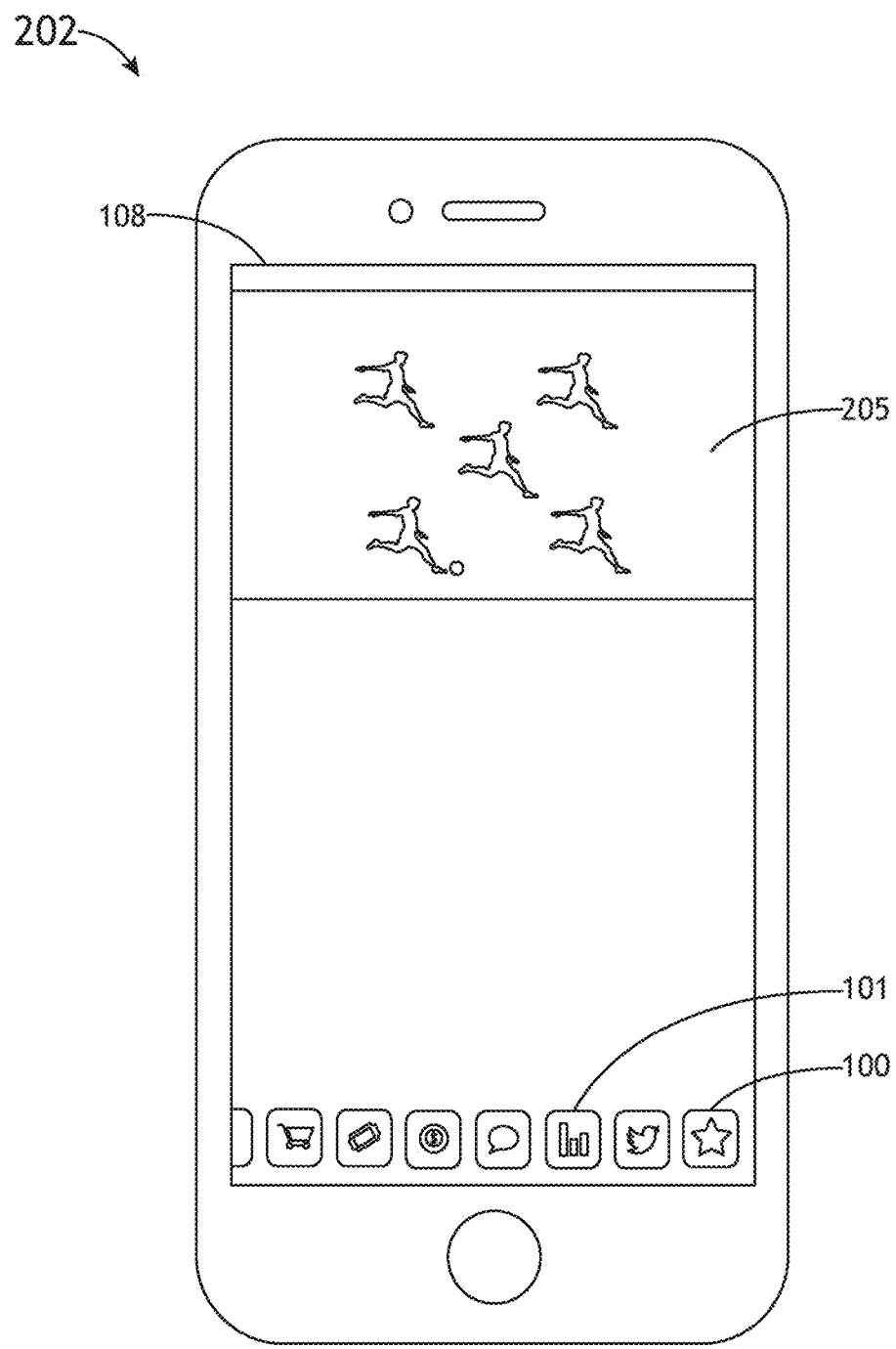
Figure 8C:
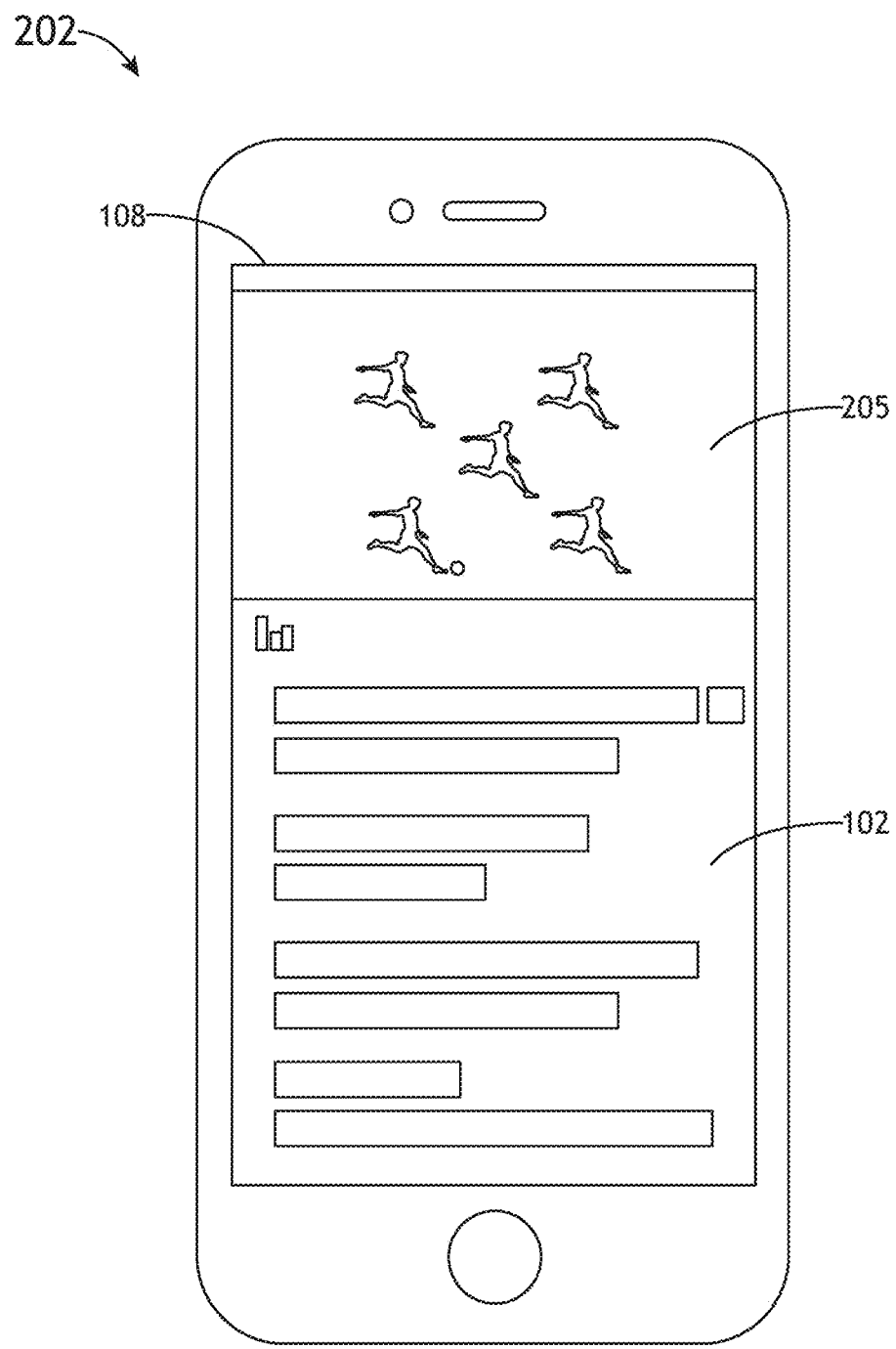

In step 404, the user device may then display the first video program stream 205 on a graphical user interface 108 of the user device 202. For example, as shown in FIG. 7A and FIG. 8A, the video program stream 205 may include a soccer match.

Figure 7D:
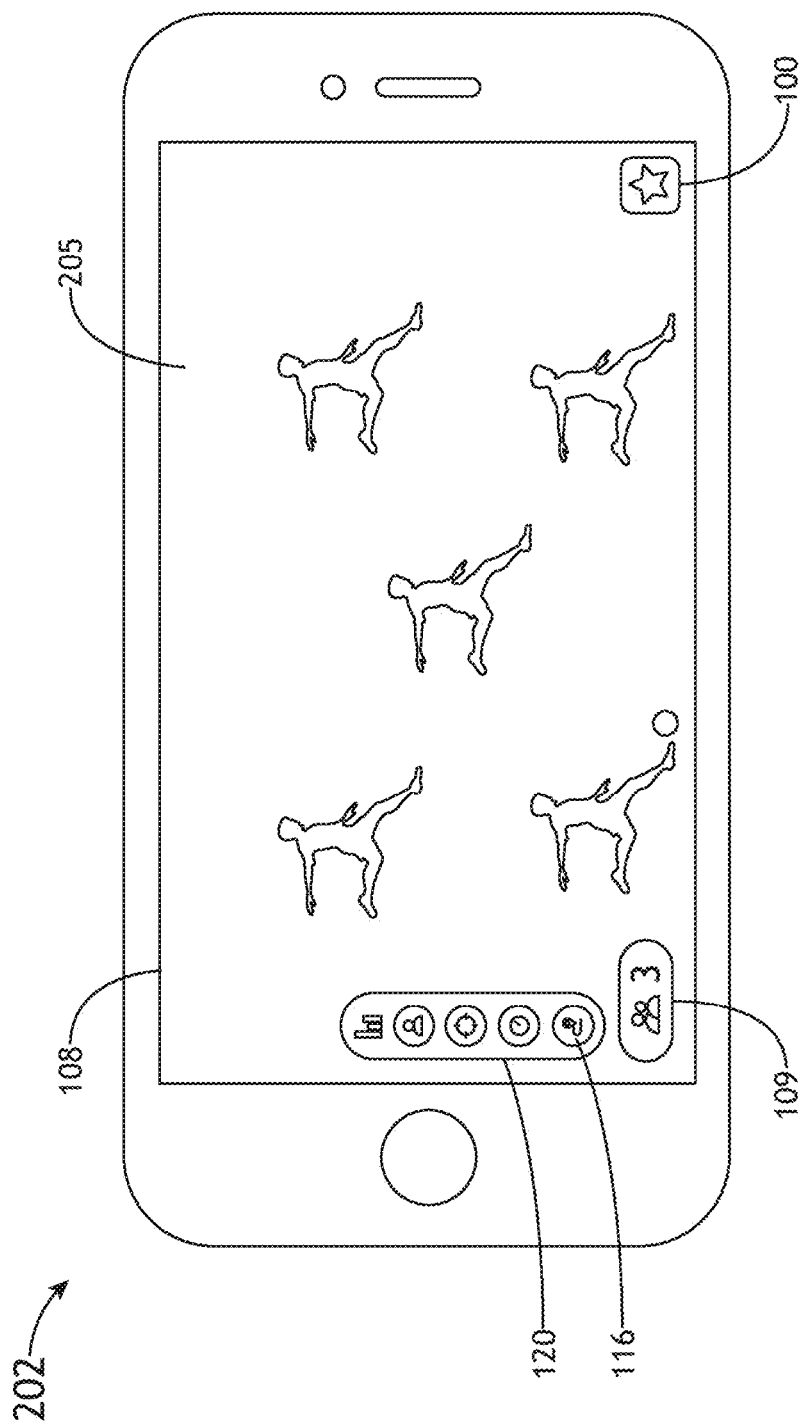
Figure 8D:
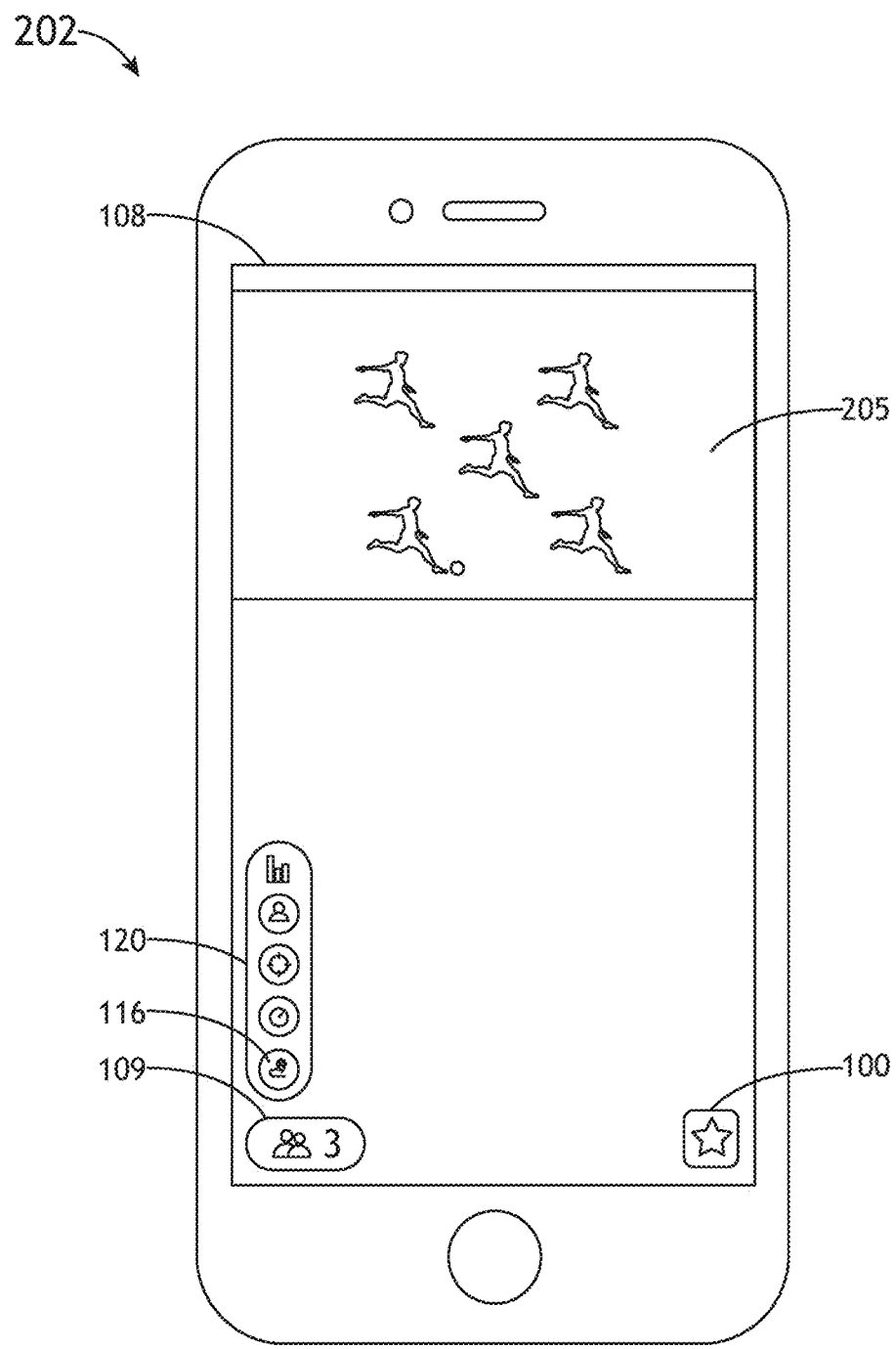

In step 406, an on-screen tracking overlay selector 120 (as shown in FIGS. 7D and 8D) may be generated in response to the user selection of a portion of the on-screen tracking overlay 102. For example, a user viewing a video program stream 205 (shown in FIG. 7A and FIG. 8A) may select an on-screen tracking overlay 102. For instance, the user may select the menu-launch button 100 in FIGS. 7A and 8A, then select an on-screen tracking overlay 102 in FIGS. 7B-7C and FIGS. 8B-8C to generate the on-screen tracking overlay selector 120.

In embodiments, the on-screen tracking overlay selector 120 may include one or more selectable buttons associated with information from one or more third party providers (e.g., one or more third party content providers 214 and/or one or more third party service providers 216). For instance, the one or more selectable buttons 116 may include a first button. The first button may be associated with information from one or more third party providers (e.g., one or more third party content providers 214 and/or one or more third party service providers 216).

In step 408, upon selection of the first button in the on-screen tracking overlay selector 120, the content overlay SDK 210/interactive engagement platform 212 may request and receive a new video program stream with embedded overlay content associated with the first button from a third party provider (e.g., a third party content provider 214 and/or a third party service provider 216).

In embodiments, the video program stream received in step 402 and the new video program stream received in step 408 may have identical camera angles. In this regard, the embedded overlays appear as if they are appearing over the first received video program stream, when in reality, the user is watching different streams based on the one or more selectable buttons selected by the user.

Figure 7E:
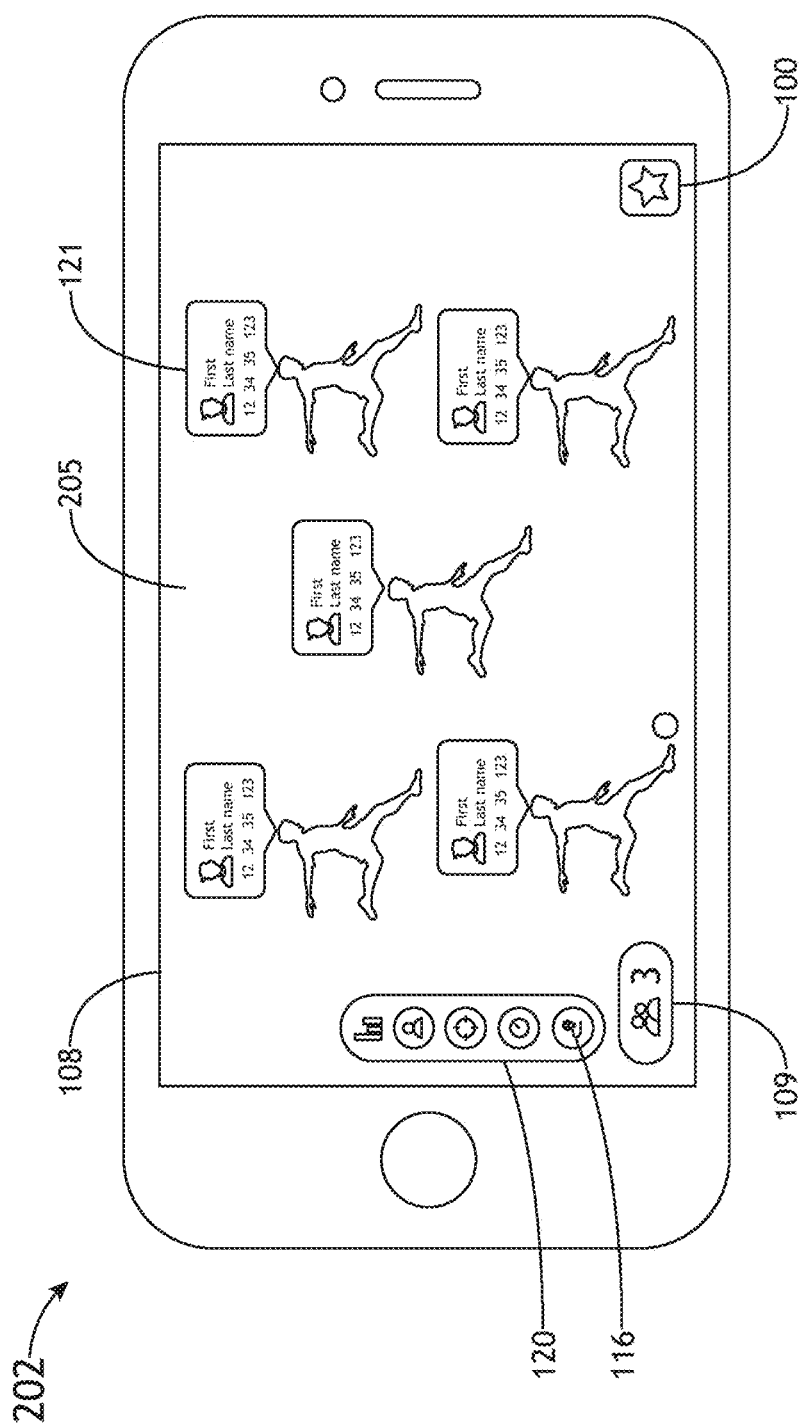
Figure 8E:
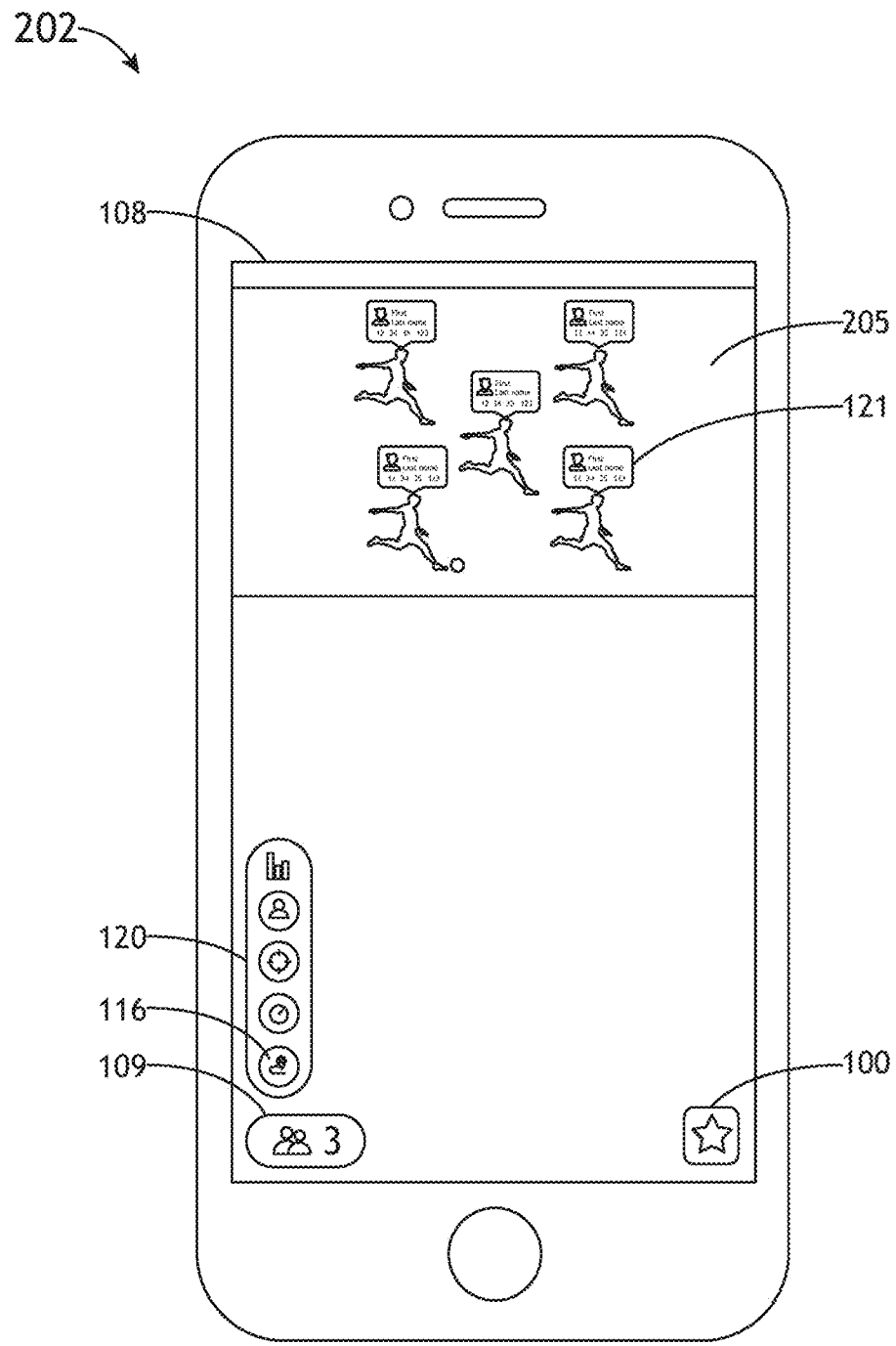

In step 410, the user device 202 may then display the new video program stream with the embedded overlay 121 associated with the first button on the graphical user interface 108, as shown in FIGS. 7E and 8E.

In a non-limiting example, the first selectable button may include a current speed button. When a user selects the current speed button, the user device 102 may be configured to request and receive a second video program stream including embedded overlay content associated with the current speed button. The user device 102 may then display the second video program stream including the embedded current speed overlay content. In this regard, the viewer is able to see the player's current speed on the user device when watching the second video program stream.

As shown in FIGS. 7E and 8E, the one or more embedded overlays 121 may include one or more "player indicators" which appear over each of the players on screen in the video program stream (e.g., the soccer match). The player indicators may include the player's name and number to help viewers identify which players are in the match, stats for the player, and the like. It is contemplated herein that the player indicators may provide real-time, or near-real time data (e.g., calories burned), statistics indicators (e.g., scoring percentages, speed of player) and other information associated with the displayed video.

The one or more embedded overlays may include one or more cards which appear on the bottom (or top) of the screen in the video program stream 205. The one or more cards may include real-time player data of one or more players of the video program stream 205.

In an optional step 412, a user may subsequently select a second button in the on-screen tracking overlay selector 120, the content overlay SDK 210/interactive engagement platform 212 may request a new video program stream with embedded overlays associated with the second button from a third party provider (e.g., a third party content provider 214 and/or a third party service provider 216).

Figure 7F:
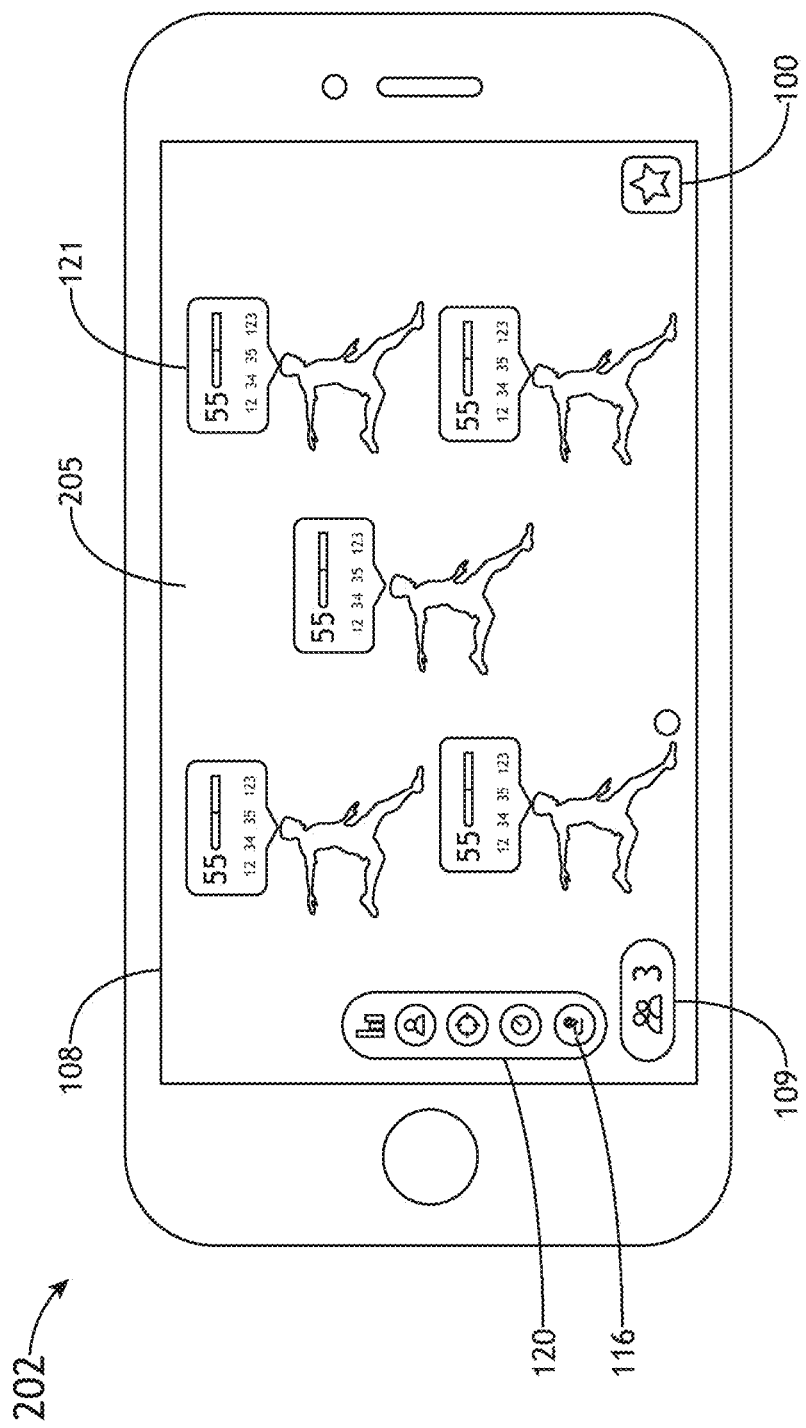
Figure 8F:
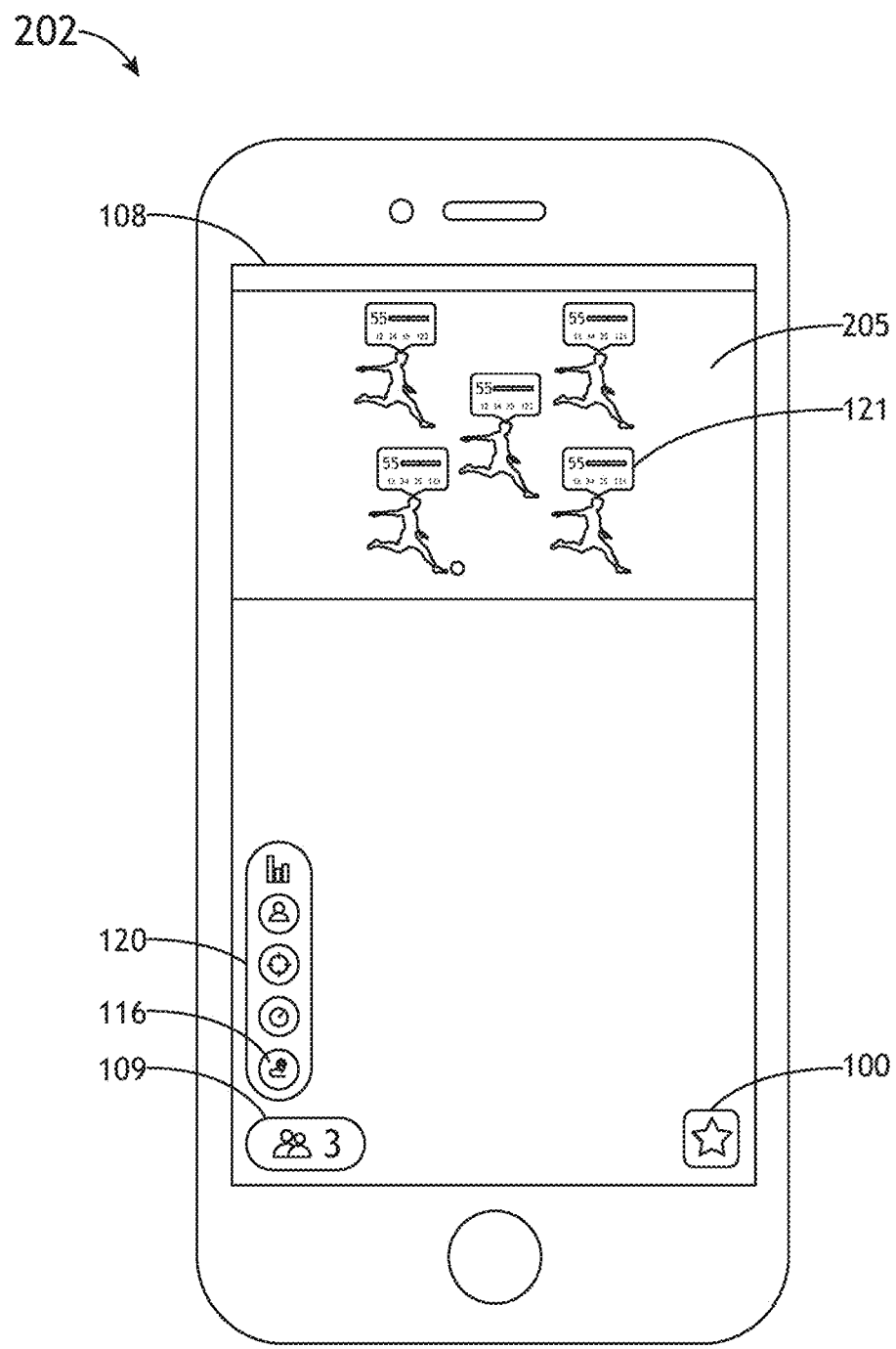

In an optional step 414, the user device 202 may then display the new video program stream with the embedded overlay 121 associated with the second button on the graphical user interface 108, as shown in FIGS. 7F and 8F. As shown in FIGS. 7F and 8F, the embedded overlays may include player indicators which show different player stats or information from that shown in the embedded overlay associated with the first button (shown in FIGS. 7E and 8E).

In embodiments, the video program stream received in step 402, the new video program stream received in step 408, and the new video program stream received in step 412 may have identical camera angles. In this regard, the embedded overlays appear as if they are appearing over the first received video program stream, when in reality, the user is watching different streams based on the one or more selectable buttons selected by the user.

Continuing with the non-limiting example, the second selectable button may include a distance run button. When a user selects the distance run button, the user device 102 may be configured to request and receive a third video program stream including embedded overlay content associated with the distance run button. The user device 102 may then display the third video program stream including the embedded distance run overlay content. In this regard, the viewer is able to see the distance the player ran on the user device when watching the third video program stream.

Figure 5:
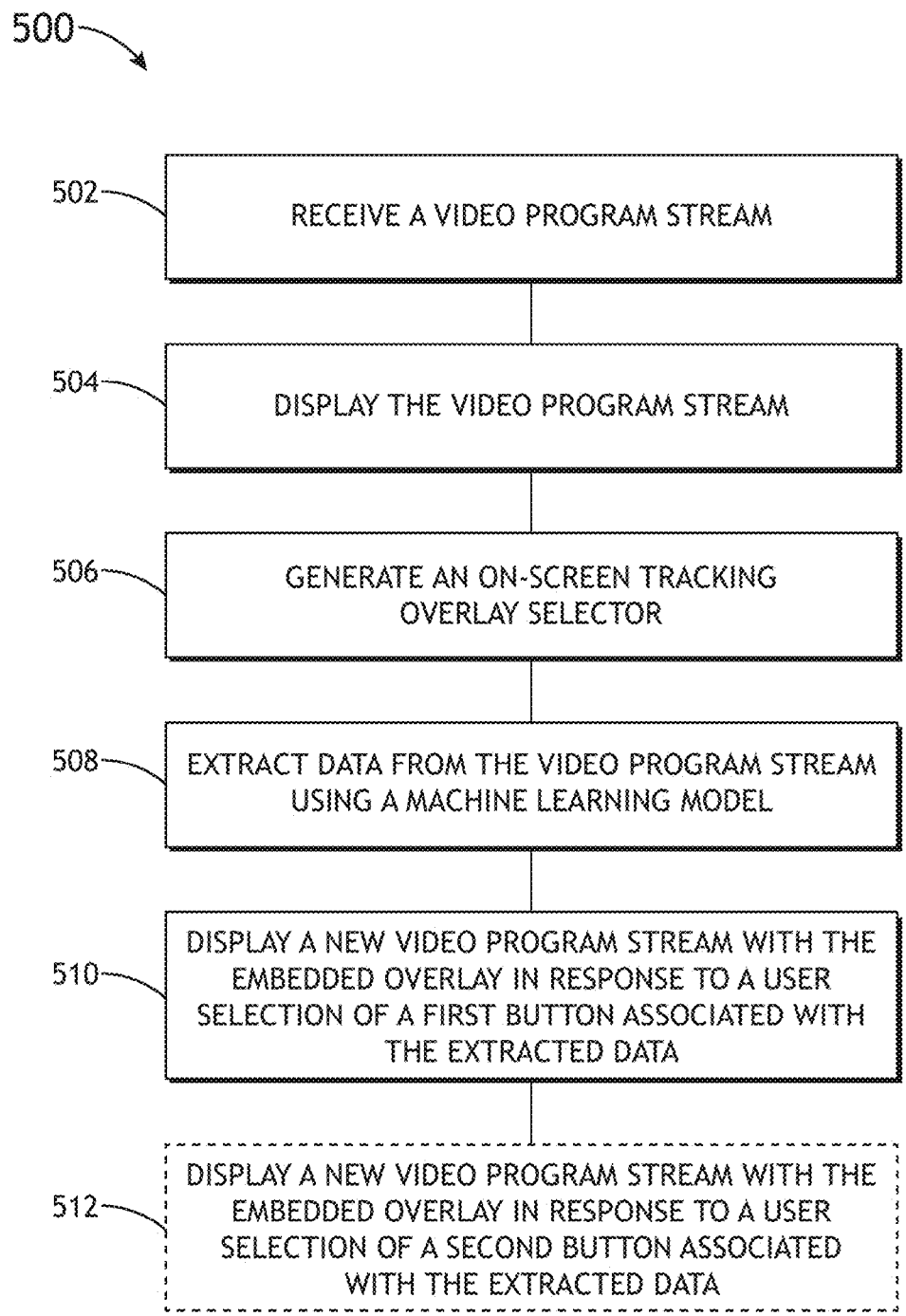
FIG. 5 illustrates a flowchart for providing interactive content overlays on a graphical user interface depicting real-time video tracking, in accordance with one or more embodiments of the present disclosure.

FIG. 5 illustrates a flowchart depicting a method 500 for providing interactive content overlays on a graphical user interface depicting real-time video tracking, in accordance with one or more embodiments of the present disclosure. It is noted herein that the steps of method 500 may be implemented all or in part by system 200. It is further recognized, however, that the method 500 is not limited to the system 200 in that additional or alternative system-level embodiments may carry out all or part of the steps of method 500.

In step 502, a content provider app 204 of a user device 202 may receive a video program stream 205 including no embedded overlay content from a content provider server 206. For example, the content provider app 204 may be configured to receive one or more video program streams 205 from one or more content provider servers 206. The one or more content provider servers 206 may be configured to receive the video program data of the video program streams 205 from one or more third-party application program interfaces 208 (third-party APIs 208) of one or more third-party content providers 214 and/or one or more third-party service providers 216. In practice, the one or more content provider servers 206 may be configured to receive video program data from the one or more third-party content providers 214 and/or third-party service providers 216 by interfacing with the one or more third-party APIs 208. In this regard, for the sake of simplicity, data/information received from these providers may be said to be received from the one or more third-party APIs 208.

In step 504, the user device 202 may then display the video program stream 205 within a graphical user interface 108 of the user device 202. It is noted herein that the video program stream may include any video program stream 205 known in the art including, but not limited to, one or more sport league streams, one or more gambling (or betting) streams, one or more fantasy league streams, or the like. For example, the one or more sport league streams may include, but are not limited to, traditional sport streams, x-sport streams, e-sport streams, and the like. For instance, as shown in FIG. 7A and FIG. 8A, the video program stream 205 may include a soccer match. In another instance, although not shown, the video program stream 205 may include a football game. In another instance, although not shown, the video program stream 205 may include a basketball game. In another instance, although not shown, the video program stream 205 may include a baseball game.

In step 506, an on-screen tracking overlay selector 120 (as shown in FIGS. 7D and 8D) may be generated in response to the user selection of a portion of the interactive content overlay 102 (e.g., the on-screen tracking overlay 102). For example, a user viewing a video program stream 205 (shown in FIG. 7A and FIG. 8A) may select an interactive content overlay 102 (e.g., an on-screen tracking overlay 102). For example, the user may select the menu-launch button 100 shown in FIGS. 7A and 8A, then select an on-screen tracking overlay 102 shown in FIGS. 7B-7C and FIGS. 8B-8C.

In step 508, the content overlay SDK 210 may then employ computer vision and one or more machine learning models to extract data from the video program stream 205. The user device 202 may be configured to integrate the one or more machine learning models to extract the data from the video program stream on the local device using the integrated machine learning model. It is noted herein that the user device 202 may integrate the machine learning model using any program/framework known in the art including, but not limited to, Core ML.

It is noted herein that the machine learning model used to extract data from the video program stream 205 may include any type of machine learning model/algorithm and/or deep learning technique or classifier known in the art including, but not limited to, a random forest classifier, a support vector machine (SVM) classifier, an ensemble learning classifier, an artificial neural network (ANN), and the like. By way of another example, the machine learning classifier may include a deep convolutional neural network. For instance, in some embodiments, the machine learning classifier may include ALEXNET and/or GOOGLENET. In this regard, the machine learning model may include any algorithm, classifier, or predictive model configured to extract data from a video program stream (e.g., extract data to be included in the overlay shown in FIGS. 7E-8F and 8E-8F).

In embodiments, the on-screen tracking overlay selector 120 includes one or more selectable buttons 116. For example, the on-screen tracking overlay selector 120 may include a first button associated with the extracted data from the machine learning model.

In step 510, the user device 202 may display the overlay 121 associated with the first button over the video program stream on the graphical user interface 108, as shown in FIGS. 7E and 8E in response to a user selection of the first button. For example, upon selection of a first button in the on-screen tracking overlay selector, the content overlay SDK 210/interactive engagement platform 212 may render an on-screen tracking overlay associated with the first button using the extracted data from the machine learning model. The content overlay SDK may then populate the overlay trackers with data associated with the first button received from the extracted data from the machine learning model and/or a third party provider (e.g., a third party content provider 214 and/or a third party service provider 216).

In embodiments, the extracted data provided by the machine learning model may be used to position the one or more overlays of the graphical user interface in the correct position over the video program stream, such that the one or more overlays are positioned over the correct player.

In embodiments, the extracted data provided by the machine learning model may be further used generate the one or more overlays of the graphical user interface with the correct information (e.g., name, number, speed, and the like).

As shown in FIGS. 7E and 8E, the one or more overlays may include one or more "player indicators" which appear over each of the players on screen in the video program stream 205 (e.g., soccer match). The one or more player indicators may include at least one of a player's name and number to help viewers identify which players are in the match, stats for the player, and the like. It is contemplated herein that the one or more player indicators may provide real-time, or near-real time, stats indicators and other information associated with the displayed video.

The one or more overlays may include one or more cards which appear on the bottom (or top) of the screen in the video program stream 205. The one or more cards may include real-time player data of one or more players of the video program stream 205.

It is noted herein that the one or more overlays 121 may include one or more interactive overlays 121. For example, the one or interactive overlays 121 may display additional player information in response to a user selection of a portion of the one or more interactive overlays 121.

In an optional step 512, a user may subsequently select a second button in the on-screen tracking overlay selector 120, the content overlay SDK 210/interactive engagement platform 212 may render an on-screen tracking overlay associated with the second button using the extracted data from the machine learning model. The content overlay SDK 210 may then populate the on-screen overlay tracker with data associated with the second button received from the extracted data from the machine learning model and/or a third party provider (e.g., a third party content provider 214 and/or a third party service provider 216). The user device 202 may then display the overlay 121 associated with the second button over the video program stream 205 on the graphical user interface 108, as shown in FIGS. 7F and 8F. As shown in FIGS. 7F and 8F, the overlays 121 may include player indicators which show different player stats or information from that shown in the overlay associated with the first button (shown in FIGS. 7E and 8E).

Figure 6:
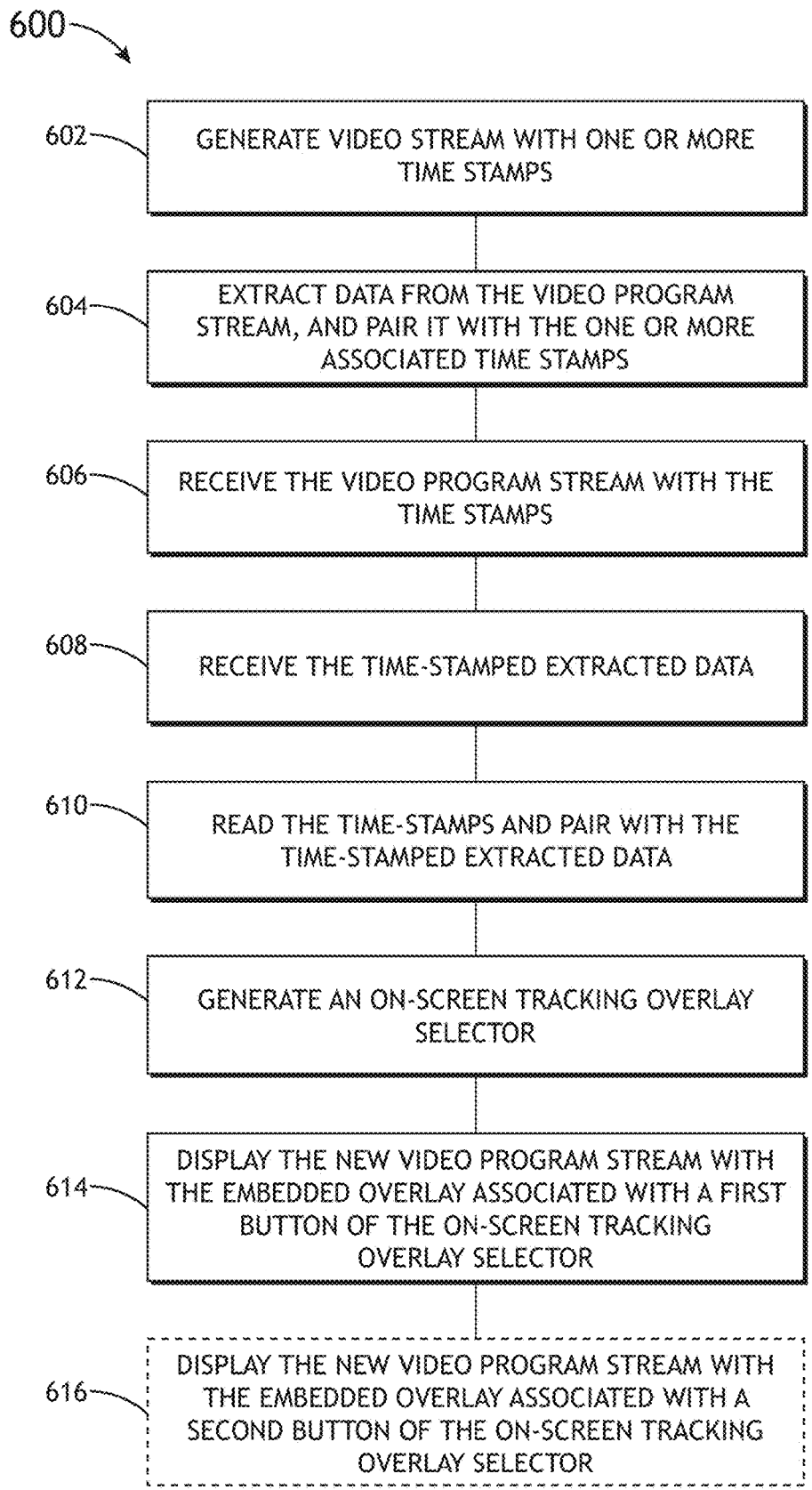
FIG. 6 illustrates a flowchart for providing interactive content overlays on a graphical user interface depicting real-time video tracking, in accordance with one or more embodiments of the present disclosure.

FIG. 6 illustrates a flowchart depicting a method 600 for providing interactive content overlays on a graphical user interface depicting real-time video tracking, in accordance with one or more embodiments of the present disclosure. It is noted herein that the steps of method 600 may be implemented all or in part by system 200. It is further recognized, however, that the method 600 is not limited to the system 200 in that additional or alternative system-level embodiments may carry out all or part of the steps of method 600.

In step 602, a video stream program stream 205 may be generated with one or more time stamps. The video program stream 205 may be received and displayed to a user via a user device 202.

In step 604, a third party content provider 214 and/or third party service provider 216 may also receive the video program stream 205, extract real-time data from the video program stream 205, and pair it with the one or more associated time stamps.

In step 606, the content provider app 212 may receive the video program stream 205 with the time stamps, and direct the video program stream 205 to the content overlay SDK 210.

In step 608, the content overlay SDK 210 may also receive the time-stamped extracted data from the third party content provider 214 and/or third party service provider 216.

In step 610, the content overlay SDK 210 may read the time-stamps from the video program stream 205, and pair it with the time-stamped extracted data from the third party content provider 214 and/or third party service provider 216.

In step 612, an on-screen tracking overlay selector 120 is generated in response to a user selection of a portion of an interactive content overlay of the video program stream 205.

In embodiments, the on-screen tracking overlay selector 120 may include one or more selectable buttons 116. For example, the one or more selectable buttons 116 may include a first button associated with the extracted, time-stamped data.

In step 614, the user may then select the first button in an on-screen tracking overlay selector 120, and the content overlay SDK 210 may render an on-screen tracking overlay 102 associated with the first button using extracted and time-stamped data from the third party provider (e.g., the third party content provider 214 and/or the third party service provider 216), as shown in FIGS. 7E and 8E. The content overlay SDK 210 may then populate an on-screen overlay tracker with data associated with the first button received from the third party provider (e.g., the third party content provider 214 and/or the third party service provider 216), as shown in FIGS. 7E and 8E. The user device 202 may then display the overlay 121 associated with the first button over the video program stream on the graphical user interface 108, as shown in FIGS. 7E and 8E.

The user may subsequently select a second button in the on-screen tracking overlay selector 120. The content overlay SDK 210 may then populate overlay trackers with data associated with the second button received from a third party provider (e.g., a third party content provider 214 and/or a third party service provider 216), as shown in FIGS. 7F and 8F. The user device 202 may then display the overlay associated with the second button over the video program stream 205 on the graphical user interface 108, as shown in FIGS. 7F and 8F.

In embodiments, the time-stamp data may be used to match the data received from the API (e.g., player name, number, current speed, positioning on the screen, and the like) with the correct frame of the video program stream, such that the one or more overlays are positioned over the correct player with the correct data in the video program stream.

As noted previously herein, the system of the present disclosure may include one or more controllers communicatively coupled to one or more servers via a network. In one embodiment, controllers and/or servers may include one or more processors and memory. In another embodiment, the one or more processors may be configured to execute a set of program instructions stored in memory, wherein the set of program instructions are configured to cause the one or more processors to carry out the steps of the present disclosure.

It is noted herein that the one or more components of system may be communicatively coupled to the various other components of system 100 in any manner known in the art. For example, the one or more components of the system (e.g., servers, controllers, user devices, processors, and the like) may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, and the like).

In one embodiment, the one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system/server or, alternatively, multiple computer systems/servers. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different components/sub-systems of the system (e.g., user devices 202, SDK/API server 218, registration server 222, API ingestion system 220, messaging system 228, advertising system 230, and the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. It is further noted that memory may be housed in a common controller housing with the one or more processors. In an alternative embodiment, the memory may be located remotely with respect to the physical location of the processors, servers, controllers, and the like. In another embodiment, the memory maintains program instructions for causing the one or more processors to carry out the various steps described through the present disclosure.

As noted previously herein, the one or more user devices of the present disclosure may include any user device known in the art. In embodiments, a user device may include a user interface. In one embodiment, the user interface may include, but is not limited to, one or more desktops, tablets, smartphones, smart watches, smart TVs, or the like. In another embodiment, the user interface includes a display used to display data of the system to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via the user interface.

As noted previously herein, various components of the system of the present disclosure may be communicatively coupled to one another via a networked configuration. In this regard, components of system may include a network interface. It is noted that a network interface may include any network interface circuitry or network interface device suitable for interfacing with a network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like. By way of another example, a network interface may be configured to communicatively couple to a network with a cloud-based architecture. Furthermore, the one or more servers of the present disclosure may include a cloud-based architecture.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for interactive video content, comprising:
a user device communicatively coupled to one or more content provider servers and at least one of one or more third-party service providers or one or more third-party content providers, wherein the user device is configured to:
receive a video program stream from a content provider server of the one or more content provider servers, the video program stream including one or more video program time stamps;
display the video program stream received from the content provider server, the video program stream including an on-screen tracking overlay;
display an on-screen tracking overlay selector in response to a user selection of a portion of the on-screen tracking overlay, the on-screen tracking overlay selector including one or more selectable buttons;
receive extracted video program data from a third-party application program interface of the at least one of one or more third-party service providers or one or more third-party content providers, the extracted video program data including overlay positioning data with one or more extracted program data time stamps, the extracted video program data including overlay content data with the one or more extracted program data time stamps, the one or more selectable buttons associated with the extracted video program data from the video program data; and
display one or more overlays over the received video program stream in response to a user selection of at least one of the one or more selectable buttons, the one or more overlays generated using the extracted video program data from the application program interface and the one or more video program time stamps of the video program stream, the one more extracted program data time stamps of the extracted video program data from the application program interface paired with the one or more video program time stamps of the video program stream to cause the one or more overlays to be displayed at a specified time over the received video program stream and displayed at a specified position over the received video program stream.

2. The system of claim 1, wherein the one or more overlays include one or more player indicators, wherein the one or more player indicators appear over one or more players of the video program stream.

3. The system of claim 1, wherein the overlay content data includes a name of a player of the one or more players, a team number of a player of the one or more players, or a statistic for a player of the one or more players.

4. The system of claim 3, wherein the one or more player indicators include at least one of: the name of a player of the one or more players, the team number of the player of the one or more players, or the statistic for the player of the one or more players.

5. A method for interactive video content, comprising:
generating a video program stream with one or more video program time stamps;
extracting real-time data from the video program stream using a third-party application program interface of a third party provider, the extracted video program data including overlay positioning data, the extracted video program data including overlay content data;
pairing the extracted real-time data from the video program stream with one or more generated time stamps using the third-party application program interface;
receiving the video program stream with the one or more time stamps;
receiving the extracted real-time data from the video program stream from the third-party application program interface of the third party provider;
reading the one or more time stamps of the video program stream;
pairing the one or more video program time stamps of the video program stream with the extracted real-time data from the video program stream to generate extracted, time-stamped data;
displaying the video program stream with an on-screen tracking overlay;
displaying an on-screen tracking overlay selector in response to a user selection of a portion of the on-screen tracking overlay, the on-screen tracking overlay selector including one or more selectable buttons, the one or more selectable buttons associated with the extracted, time-stamped data;
displaying one or more overlays over the video program stream in response to a user selection of at least one of the one or more selectable buttons; and
positioning the one or more overlays over the video program stream at a specified position over the received video program steam and at a specified time during the received video program stream based on the extracted, time-stamped data.

6. The method of claim 5, wherein the one or more overlays include one or more player indicators, wherein the one or more player indicators appear over one or more players of the video program stream.

7. The method of claim 6, wherein the overlay content data includes a name of a player of the one or more players, a team number of a player of the one or more players, or a statistic for a player of the one or more players.

8. The method of claim 7, wherein the one or more player indicators include at least one of: the name of a player of the one or more players, the team number of the player of the one or more players, or the statistic for the player of the one or more players.

* * * * *